(12) United States Patent
Yang et al.

(10) Patent No.: US 12,335,453 B2
(45) Date of Patent: Jun. 17, 2025

(54) DETECTION, ANALYSIS AND CORRECTION OF DISPARITIES IN A DISPLAY SYSTEM UTILIZING DISPARITY SENSING PORT

(71) Applicant: Meta Platforms Technologies, LLC, Menlo Park, CA (US)

(72) Inventors: Yang Yang, Redmond, WA (US); Wai Sze Tiffany Lam, Lynnwood, WA (US); Dominic Meiser, Bothell, WA (US); Wanli Chi, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/561,411

(22) Filed: Dec. 23, 2021

(65) Prior Publication Data

US 2023/0209032 A1    Jun. 29, 2023

(51) Int. Cl.
*H04N 19/00* (2014.01)
*F21V 8/00* (2006.01)
(Continued)

(52) U.S. Cl.
CPC ......... *H04N 13/128* (2018.05); *G02B 6/0016* (2013.01); *G02B 6/0036* (2013.01);
(Continued)

(58) Field of Classification Search
CPC ............... H04N 13/128; H04N 13/271; H04N 2013/0081; H04N 13/204; H04N 13/25;
(Continued)

(56) References Cited

U.S. PATENT DOCUMENTS 9,541,383 B2 * 1/2017 Abovitz .................. G06F 3/005
9,602,799 B2 * 3/2017 Kobayashi ........... H04N 13/341
(Continued)

FOREIGN PATENT DOCUMENTS

WO    2020146451 A1    7/2020

OTHER PUBLICATIONS

International Search Report and Written Opinion for International Application No. PCT/US2022/053600, mailed Apr. 19, 2023, 10 pages.
International Search Report and Written Opinion for International Application No. PCT/US2022/053626, mailed Apr. 21, 2023, 7 pages.

*Primary Examiner* — Frank F Huang
(74) *Attorney, Agent, or Firm* — Greenberg Traurig, LLP

(57) ABSTRACT

According to examples, a system for detection, analysis and correction of disparities in display systems utilizing one or more disparity sensing port is described. The system may include a processor and a memory storing instructions. In addition, the system may include a first lens including a first waveguide for displaying a first image and a second lens including a second waveguide for displaying a second image. Furthermore, the system may include a first projector associated with the first lens to propagate first display light associated with the first image, a second projector associated with the second lens to propagate second display light associated with the second image and a disparity sensing port to receive the first display light and the second display light to determine a disparity associated with the first image and the second image.

20 Claims, 19 Drawing Sheets

(51) Int. Cl.
*G02B 27/01* (2006.01)
*H04N 13/128* (2018.01)
*H04N 13/344* (2018.01)
*H04N 13/398* (2018.01)
*H04N 13/00* (2018.01)

(52) U.S. Cl.
CPC ....... *G02B 27/0172* (2013.01); *H04N 13/344* (2018.05); *H04N 13/398* (2018.05); *G02B 2027/011* (2013.01); *G02B 2027/0134* (2013.01); *G02B 2027/0138* (2013.01); *G02B 2027/014* (2013.01); *G02B 2027/0178* (2013.01); *H04N 2013/0081* (2013.01)

(58) Field of Classification Search
CPC ....................... G06T 7/593; G06T 5/50; G06T 2207/10028; G06T 2207/20221
See application file for complete search history.

(56) References Cited

U.S. PATENT DOCUMENTS

| | | | |
|---|---|---|---|
| 11,128,817 B2* | 9/2021 | Bleyer | H04N 23/11 |
| 11,202,043 B1 | 12/2021 | Elazhary et al. | |
| 2008/0247150 A1 | 10/2008 | Itoh et al. | |
| 2012/0281943 A1 | 11/2012 | Popovich et al. | |
| 2015/0334380 A1* | 11/2015 | Kim | H04N 13/349 348/54 |
| 2018/0077210 A1* | 3/2018 | Hannuksela | H04N 21/8456 |
| 2018/0189550 A1* | 7/2018 | McCombe | G06V 40/172 |
| 2018/0284440 A1 | 10/2018 | Popovich et al. | |
| 2018/0299251 A1 | 10/2018 | Liba et al. | |
| 2018/0307310 A1* | 10/2018 | McCombe | H04N 23/80 |
| 2020/0074658 A1* | 3/2020 | Yu | G06T 7/557 |
| 2020/0327642 A1* | 10/2020 | Saha | G06T 5/50 |
| 2021/0099691 A1 | 4/2021 | Danziger | |
| 2021/0217147 A1 | 7/2021 | Edwin et al. | |
| 2021/0223548 A1 | 7/2021 | Maimone et al. | |
| 2021/0239997 A1 | 8/2021 | St. Hilaire | |

* cited by examiner

DETECTION, ANALYSIS AND CORRECTION OF DISPARITIES IN A DISPLAY SYSTEM UTILIZING DISPARITY SENSING PORT

TECHNICAL FIELD

This patent application relates generally to a display system with image correction, and more specifically, to systems and methods for detection, analysis, and correction of image disparities in a display device using at least one disparity sensing port.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms wearable display systems. One such example may be a head-mounted device (HMD), such as wearable eyewear, wearable headset, or eyeglasses. In some examples, the head-mounted device (HMD) may employ a first projector and a second projector to propagate a first image and a second image, respectively, to generate "binocular" vision for viewing by a user.

However, if the first image and the second image are misaligned, a display system of the head-mounted device (HDM) may provide, for viewing by a user, a set of images that are unmerged or displaced. When this occurs, the user may experience poor visual acuity and significant visual discomfort, which often results in dizziness, eye fatigue, or other side effects.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
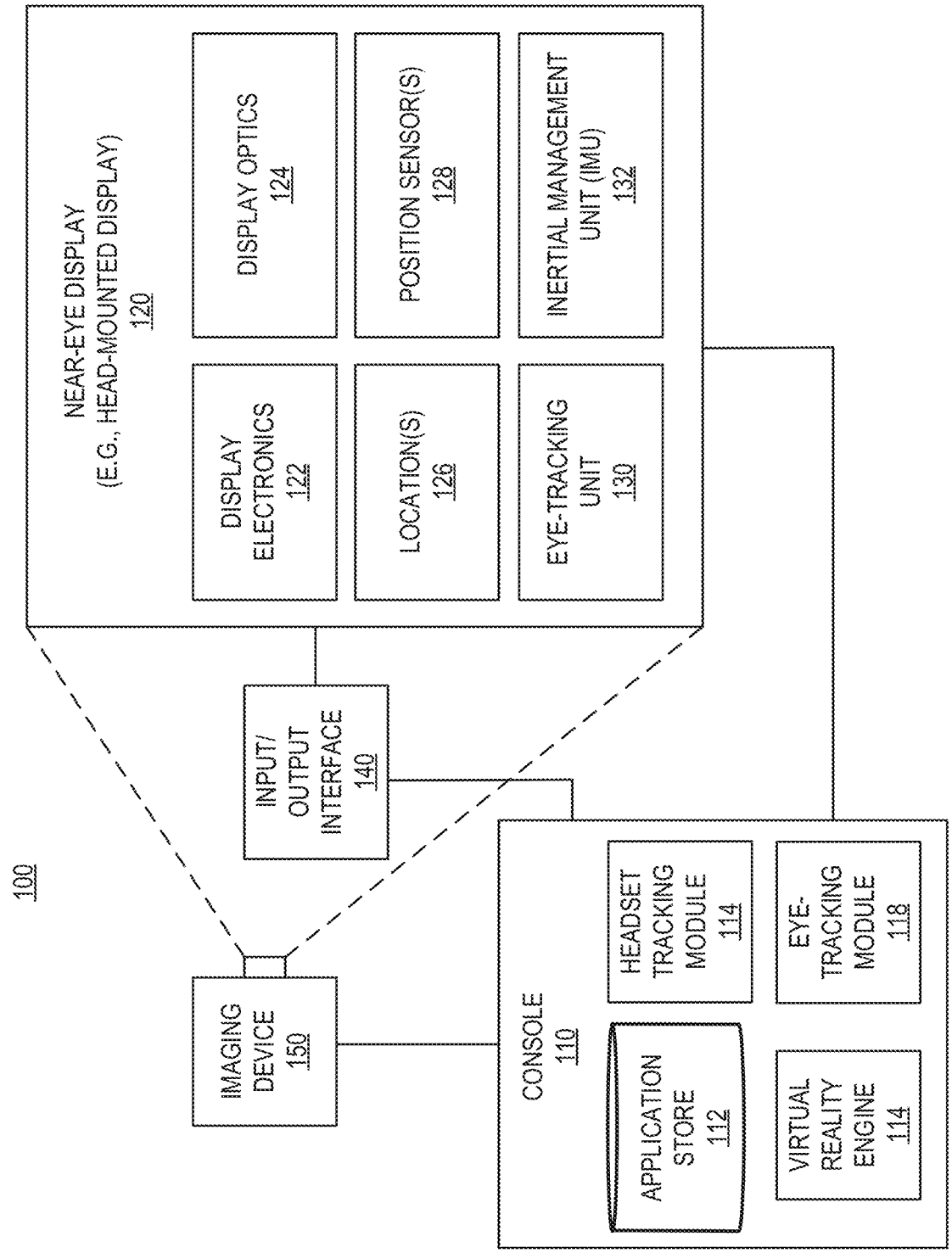
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

The systems and methods described herein may provide a display system (e.g., AR-based head-mounted device (HMD) or eyewear) including at least one disparity sensing port for receiving light from at least one projector, e.g., via one or more optical components, of the display system to provide disparity sensing, analysis, and correction of images. In some examples, and as discussed further below, a disparity sensing port, as described herein, may be a component associated with the device system to receive light that is typically unused and coming from a projector or one or more optical components to provide light to a disparity sensing detector for disparity sensing.

As used herein, "unused" light may include any light that may be propagated to and/or within a waveguide configuration but not be propagated from or out of a waveguide configuration for viewing purposes by a user or wearer of the head-mounted device (HMD). Also, as used herein, "disparity" may refer to any issue (e.g., a sub-optimal or sub-standard aspect) associated with projection of an image for viewing by a user. In most cases, such disparities may refer to issues associated with a first image and a second image provided by a display device for viewing by a user where the user's perception of the first and second images appear to be unmerged, displaced, shifted, rotated, or distorted by itself or relative to one another, or exhibit other characteristics that require correction for proper viewing by a user. Moreover, "disparity sensing" may refer to detecting any existence of, or events or changes, associated with such disparities in a display device.

The systems and methods described herein may be associated with a volume Bragg grating (VBG)-based waveguide display device. As used herein, a volume Bragg grating (VBG) may refer to a substantially and/or completely transparent optical device or component that may exhibit a periodic variation of refractive index (e.g., using a volume Bragg grating (VBG)). As discussed further in the examples below, an arrangement of one or more volume Bragg gratings (VBGs) may be provided with or integrated within a waveguide configuration of a display system. As used herein, a waveguide (or "waveguide configuration") may refer to any optical structure that propagates a variety of signals (e.g., optical signals, electromagnetic waves, sound waves, etc.) in one or more directions. Employing principles of physics, information contained in such signals, may be directed using any number of waveguides or similar components.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eyebox, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eyebox" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eyebox.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a HMD, a pair of glasses, or other similar wearable eyewear or device. Examples of the near-eye display 120 are further described below with respect to FIGS. 2 and 3. Additionally, in some examples, the functionality described herein may be used in a HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near-eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
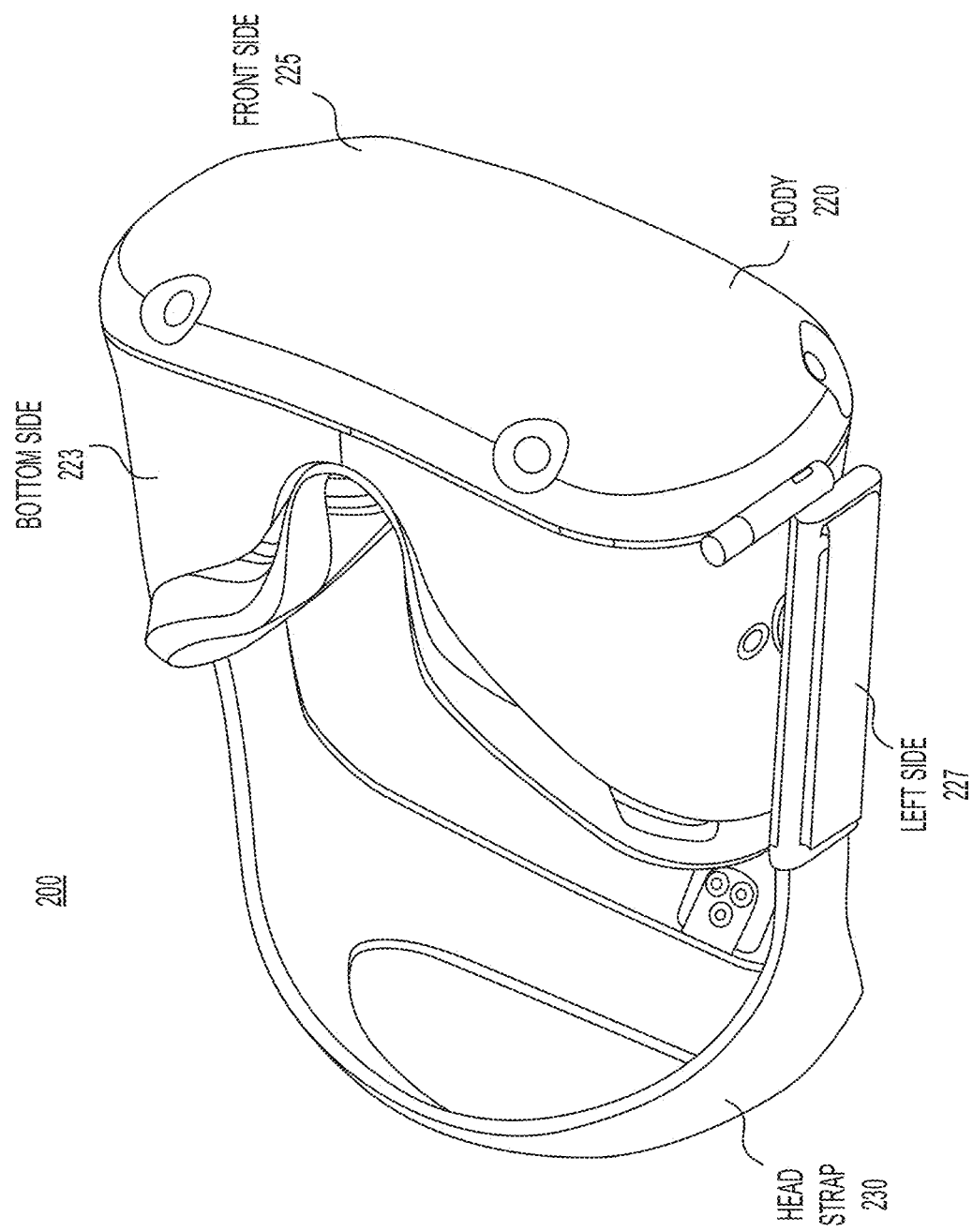
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. In some examples, the HMD device 200 may include additional, fewer, and/or different components.

In some examples, the HMD device 200 may present, to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
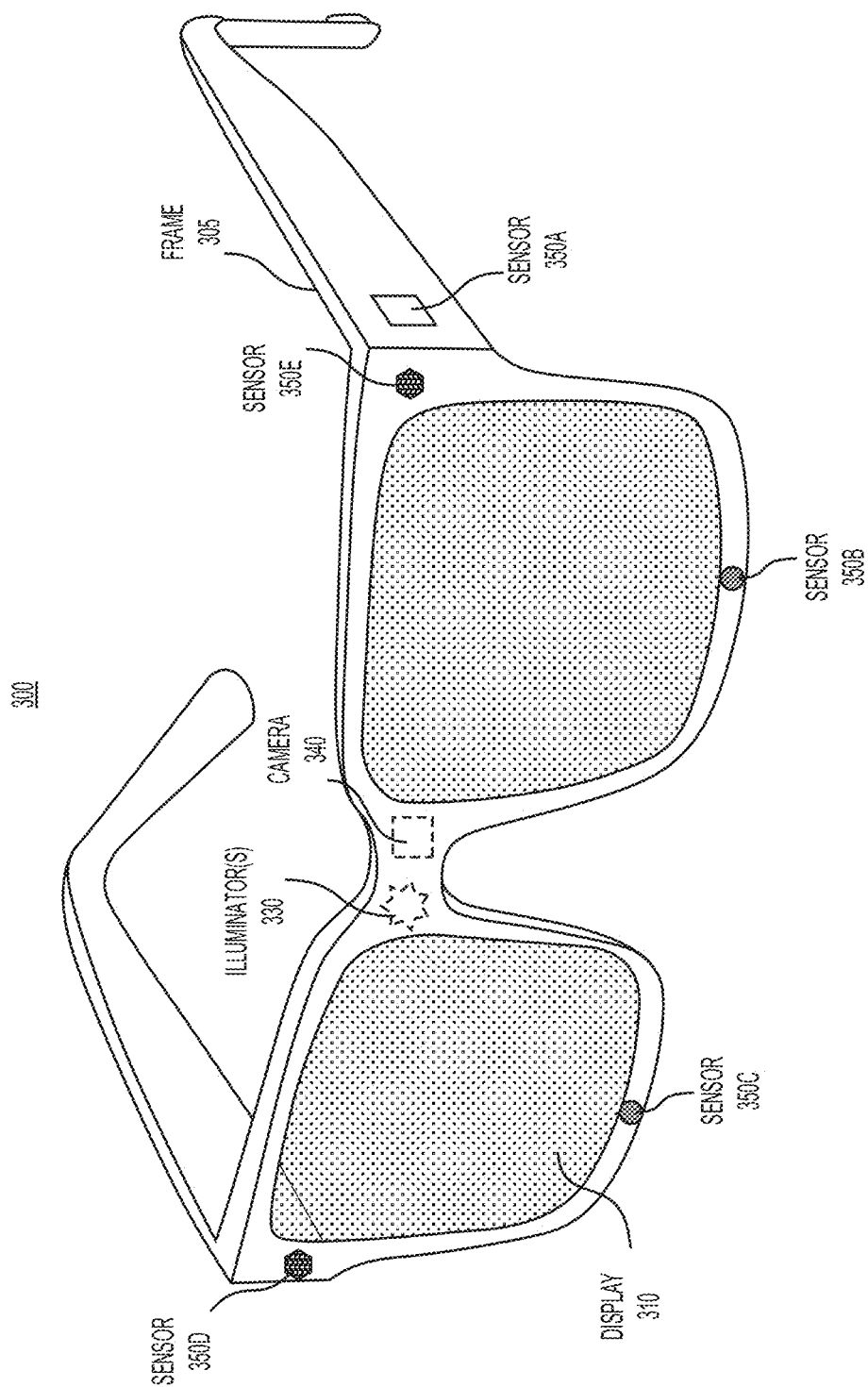
FIG. 3 is a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific implementation of near-eye display 120 of FIG. 1, and may be configured to operate as a virtual reality display, an augmented reality display, and/or a mixed reality display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminators 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

Figure 4:
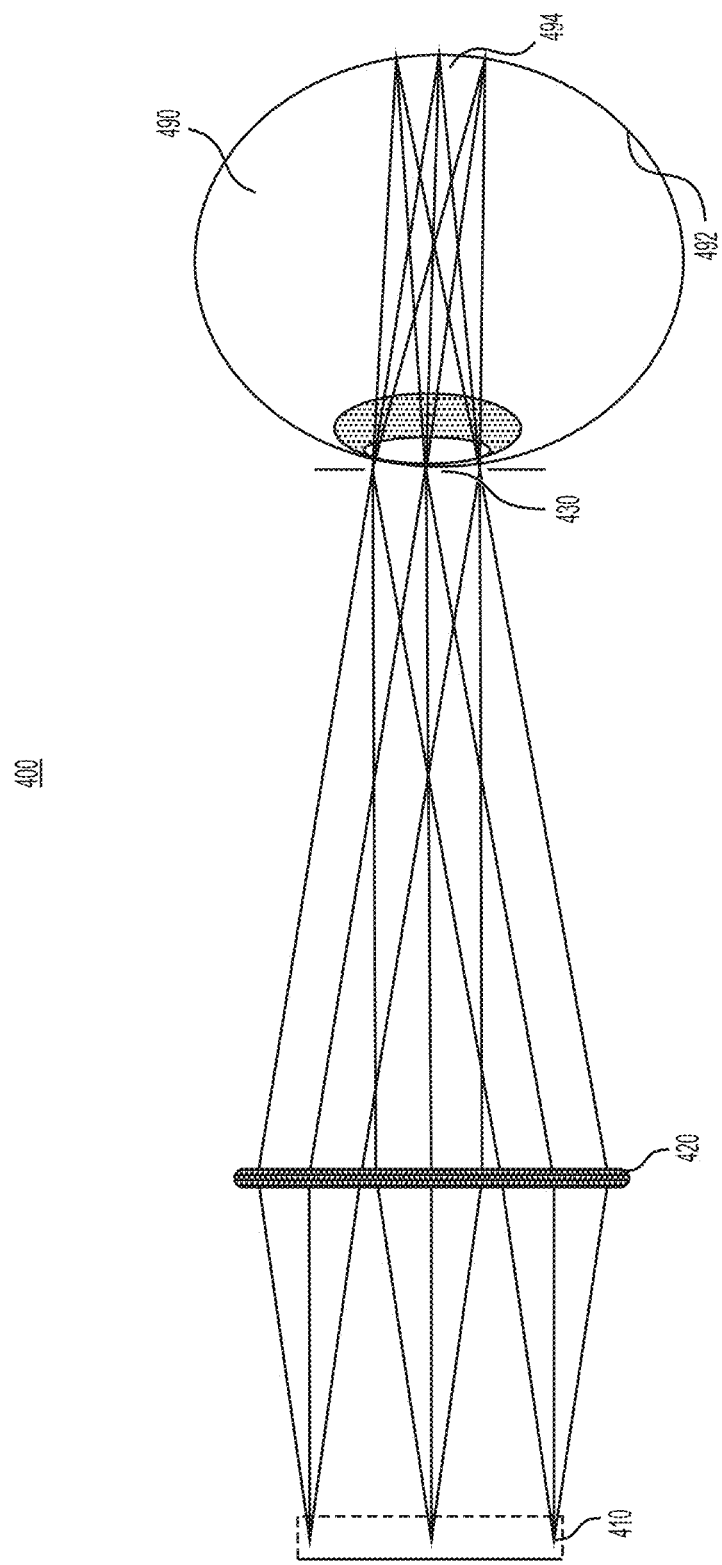
FIG. 4 illustrates a schematic diagram of an optical system in a near-eye display system, according to an example.

FIG. 4 illustrates a schematic diagram of an optical system 400 in a near-eye display system, according to an example. In some examples, the optical system 400 may include an image source 410 and any number of projector optics 420 (which may include waveguides having gratings as discussed herein). In the example shown in FIG. 4, the image source 410 may be positioned in front of the projector optics 420 and may project light toward the projector optics 420. In some examples, the image source 410 may be located outside of the field of view (FOV) of a user's eye 490. In this case, the projector optics 420 may include one or more reflectors, refractors, or directional couplers that may deflect light from the image source 410 that is outside of the field of view (FOV) of the user's eye 490 to make the image source 410 appear to be in front of the user's eye 490. Light from an area (e.g., a pixel or a light emitting device) on the image source 410 may be collimated and directed to an exit pupil 430 by the projector optics 420. Thus, objects at different spatial locations on the image source 410 may appear to be objects far away from the user's eye 490 in different viewing angles (i.e., fields of view (FOV)). The collimated light from different viewing angles may then be focused by the lens of the user's eye 490 onto different locations on retina 492 of the user's eye 490. For example, at least some portions of the light may be focused on a fovea 494 on the retina 492. Collimated light rays from an area on the image source 410 and incident on the user's eye 490 from a same direction may be focused onto a same location on the retina 492. As such, a single image of the image source 410 may be formed on the retina 492.

In some instances, a user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Also, in some examples, to create a fully immersive visual environment, a large field of view (FOV) may be desirable because a large field of view (FOV) (e.g., greater than about 60°) may provide a sense of "being in" an image, rather than merely viewing the image. In some instances, smaller fields of view may also preclude some important visual information. For example, a head-mounted display (HMD) system with a small field of view (FOV) may use a gesture interface, but users may not readily see their hands in the small field of view (FOV) to be sure that they are using the correct motions or movements. On the other hand, wider fields of view may require larger displays or optical systems, which may influence the size, weight, cost, and/or comfort of the head-mounted display (HMD) itself.

In some examples, a waveguide may be utilized to couple light into and/or out of a display system. In particular, in some examples and as described further below, light of projected images may be coupled into or out of the waveguide using any number of reflective or diffractive optical elements, such as gratings. For example, as described further below, one or more volume Bragg gratings (VBGs) may be utilized in a waveguide-based, back-mounted display system (e.g., a pair of glasses or similar eyewear).

In some examples, one or more volume Bragg gratings (VBGs) (or two portions of a same grating) may be used to diffract display light from a projector to a user's eye. Furthermore, in some examples, the one or more volume Bragg gratings (VBGs) may also help compensate for any dispersion of display light caused by each other to reduce the overall dispersion in a waveguide-based display system.

Figure 5:
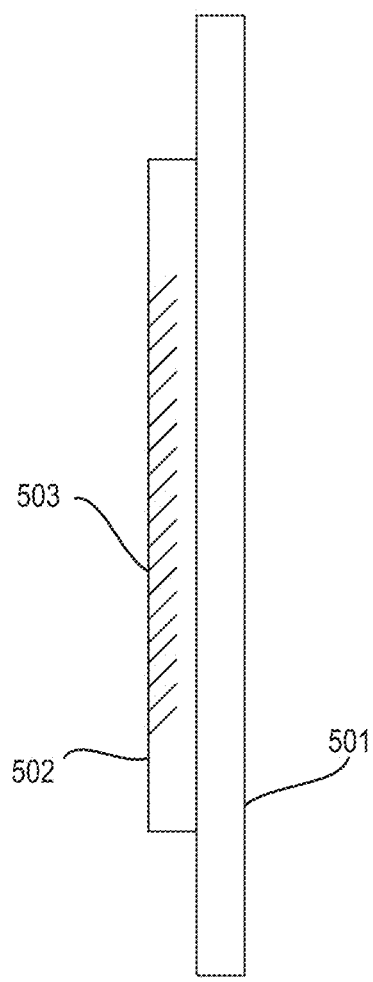
FIG. 5 illustrates a diagram of a waveguide, according to an example.

FIG. 5 illustrates a diagram of a waveguide configuration 500, according to an example. In some examples, the waveguide configuration 500 may include a plurality of layers, such as at least one substrate 501 and at least one photopolymer layer 502. In some examples, the substrate 501 may be a comprised of a polymer or glass material. In some examples, the photopolymer layer 502 may be transparent or "see-through", and may include any number of photosensitive materials (e.g., a photo-thermo-refractive glass) or other similar material.

In some examples, the at least one substrate 501 and the at least one photopolymer layer 502 may be optically bonded (e.g., glued on top of each other) to form the waveguide configuration 500. In some examples, the substrate 501 may have a thickness of anywhere between around 0.1-1.0 millimeters (mm) or other thickness range. In some examples, the photopolymer layer 502 may be a film layer having a thickness of anywhere between about 50-500 micrometers (μm) or other range.

In some examples, one or more volume Bragg gratings (VBGs) may be provided in (or exposed into) the photopolymer layer 502. That is, in some examples, the one or more volume Bragg gratings may be exposed by generating an interference pattern 503 into the photopolymer layer 502. In some examples, the interference pattern 503 may be generated by superimposing two lasers to create a spatial modulation that may generate the interference pattern 503 in and/or throughout the photopolymer layer 502. In some examples, the interference pattern 503 may be a sinusoidal pattern. Also, in some examples, the interference pattern 503 may be made permanent via a chemical, optical, mechanical, or other similar process.

By exposing the interference pattern 503 into the photopolymer layer 502, for example, the refractive index of the photopolymer layer 502 may be altered and a volume Bragg grating may be provided in the photopolymer layer 502. Indeed, in some examples, a plurality of volume Bragg gratings or one or more sets of volume Bragg gratings may be exposed in the photopolymer layer 502. It should be appreciated that this technique may be referred to as "multiplexing." It should also be appreciated that other various techniques to provide a volume Bragg grating (VBG) in or on the photopolymer layer 502 may also be provided.

Figure 6:
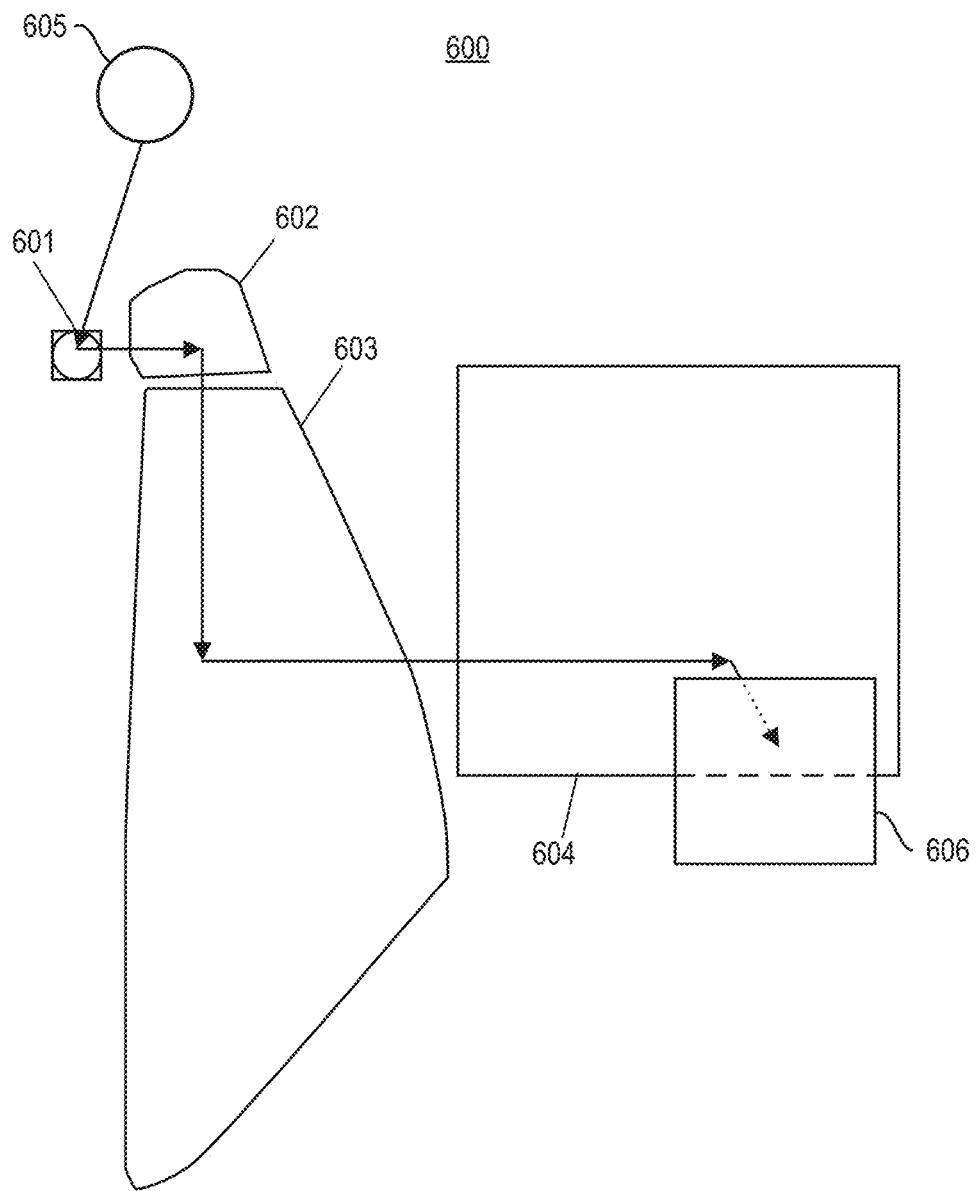
FIG. 6 illustrates a diagram of a waveguide including an arrangement of volume Bragg gratings (VBGs), according to an example

FIG. 6 illustrates a diagram of a waveguide configuration 600 including an arrangement of volume Bragg gratings (VBGs), according to an example. In some examples, the waveguide configuration 600 may be used a display system, similar to the near-eye display system 300 of FIG. 3. The waveguide configuration 600, as shown, may include an input volume Bragg grating (VBG) 601 ("input grating" or "IG", "inbound grating", or "in-coupling grating"), a first middle volume Bragg grating (VBG) 602 ("first middle grating" or "MG1"), a second middle volume Bragg grating (VBG) 603 ("second middle grating" or "MG2"), and an output volume Bragg grating (VBG) 604 ("output grating" or "OG", "outbound grating", or "out-coupling grating"). It should be appreciated that, as used herein and in some instances, the terms "grating" and "gratings" may be used interchangeably, in that "grating" may include an arrangement of a plurality of gratings or grating structures.

In some examples, a projector 605 of the display system may transmit display light (indicated by an arrow) to the arrangement of volume Bragg gratings (VBGs) 601-604, starting with the input volume Bragg grating (VBG) 601 (which receives the display light from the projector), then through the first middle volume Bragg grating (VBG) 602 and the second middle volume Bragg grating (VBG) 603, and then to the output volume Bragg grating (VBG) 604 which propagates the display light to an eyebox or a user's eye 606.

As discussed above, the waveguide configuration 600 may include any number of volume Bragg gratings (VBGs) that may be exposed into a "see-through" photopolymer material, such as glass or plastic. In some examples and as discussed above, one or more of the arrangement of volume Bragg gratings (VBGs) 601-604 may be patterned (e.g., using sinusoidal patterning) into and/or on a surface of the photopolymer material. In this way, the entire waveguide configuration 600 may be relatively transparent so that a user may see through to the other side. At the same time, the waveguide configuration 600, with its various arrangements of volume Bragg gratings (VBGs) 601-604 may (among other things) receive the propagated display light from the projector and exit the propagated display light in front of a user's eyes for viewing. In this way any number of augmented reality (AR) and/or mixed reality (MR) environments may be provided to and experienced by the user. In addition, in some examples, the arrangement of volume Bragg gratings (VBGs) 601-604 may be implemented to "expand" (i.e., horizontally and/or vertically) a region in space to be viewed so that a user may view a displayed image regardless of where a pupil of a user's eye may be. As such, in some examples, by expanding this viewing region, the arrangement of volume Bragg gratings (VBGs) 601-604 may ensure that a user may move their eye in various directions and still view the displayed image.

Figure 7A:
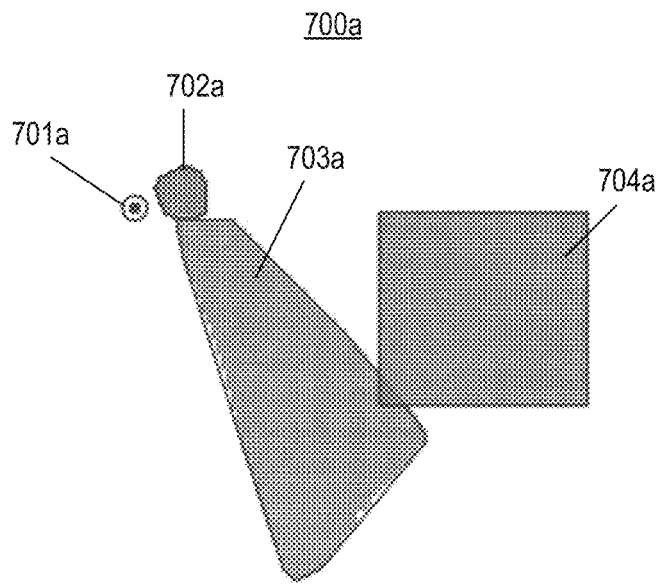
FIGS. 7A-B illustrate diagrams of waveguide configurations including an arrangement of volume Bragg gratings (VBGs), according to examples.
Figure 7B:
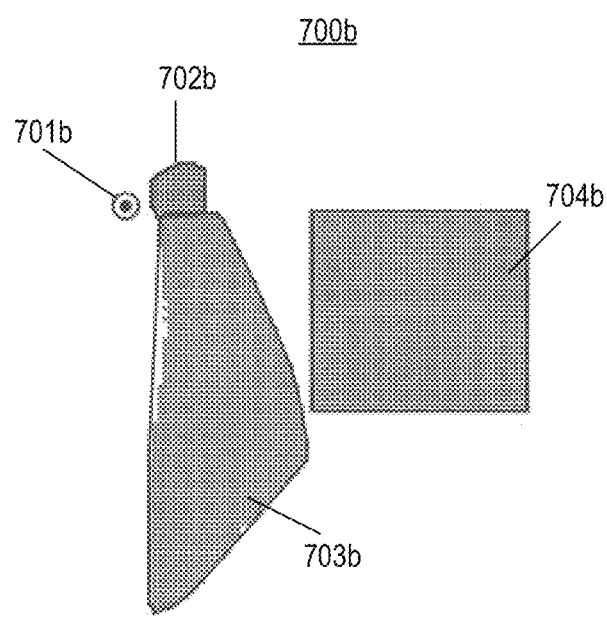

FIGS. 7A-B illustrate diagrams of waveguide configurations 700a-700b including an arrangement of volume Bragg gratings (VBGs), according to examples. For example, waveguide configuration 700a may illustrate one arrangement of volume Bragg gratings (VBGs) 701a-704a and waveguide configuration 700b may illustrate another arrangement of volume Bragg gratings (VBGs) 701b-704b. It should be appreciated that these waveguide configurations 700a-700b, or other configurations, may be included in a waveguide-based display system, as described herein.

In some examples, as discussed further below, the arrangement of volume Bragg gratings (VBGs) 701a-704a may be combined (i.e., "stacked" or "tiled") with the arrangement of volume Bragg gratings (VBGs) 701b-704b. In particular, the arrangement of volume Bragg gratings (VBGs) 701a-704a (i.e., directed to a left field of view (FOV)) and the arrangement of volume Bragg gratings (VBGs) 701b-704b (i.e., directed to a right field of view (FOV)) may be implemented (i.e., "tiled") to cooperatively expand a viewing eyebox and support of a larger field of view (FOV).

In some examples, the arrangement of volume Bragg gratings (VBGs) 701a-704a may include an input volume Bragg grating (VBG) 701a, a first middle volume Bragg grating (VBG) 702a, a second middle volume Bragg grating (VBG) 703a, and an output volume Bragg grating (VBG) 704a. So, in some examples, a projector (not shown) may propagate display light to the input volume Bragg grating (VBG) 701a, through the first middle volume Bragg grating (VBG) 702a and the second middle volume Bragg grating (VBG) 703a, and for exiting through the output volume Bragg grating (VBG) 704a. More specifically, in some examples, a first expansion of a field of view (FOV) (in a first dimension) may be accomplished via the first middle volume Bragg grating (VBG) 702a and the second middle volume Bragg grating (VBG) 703a, while a second expansion of the field of view (FOV) (in a second dimension) may be accomplished via the output volume Bragg grating (VBG) 704a. Indeed, in some examples, this arrangement may enable a −a° to +b° span (e.g., −30° to +5° span) for a first dimension (e.g., horizontal) of a field of view (FOV) and −c° to +d° span (e.g., −20° to +20° span) for a second dimension (e.g., vertical) of a field of view (FOV), where a, b, c, and d may be any integer.

Also, as shown in FIG. 7B, in some examples, a projector (not shown) may propagate display light to input volume Bragg grating (VBG) 701b, a first middle volume Bragg grating (VBG) 702b and a second middle volume Bragg grating (VBG) 703b and output volume Bragg gratings (VBG) 704b. Again, in some examples, the projector may propagate display light to the input volume Bragg grating (VBG) 701b, through the first middle volume Bragg grating (VBG) 702b and the second middle volume Bragg grating (VBG) 703b and for exiting through the output volume Bragg grating (VBG) 704b. In particular, in some examples, a first expansion of a field of view (FOV) (in a first dimension) may be accomplished via the first middle volume Bragg grating (VBG) 702b and the second middle volume Bragg grating (VBG) 703b, while a second expansion of the field of view (FOV) (in a second dimension) may be accomplished via the output volume Bragg grating (VBG) 704b. So, in some examples, this arrangement may enable a −a° to +b° span for a first dimension (e.g., horizontal) of a field of view (FOV), and −c° to +d° expansion span for a second dimension (e.g., vertical) of a field of view (FOV), where a, b, c, and d may be any integer, similar to what is described above.

As discussed above, in some examples, a "back-mounted" projector may be utilized to provide a significant reduction of size (i.e., bulk) and weight of a display system. For example, in some instances, a display system in a shape of eyewear (e.g., eyeglasses) may implement one or more projectors located "eye-side" to provide a significant improvement in user experience.

Figure 8:
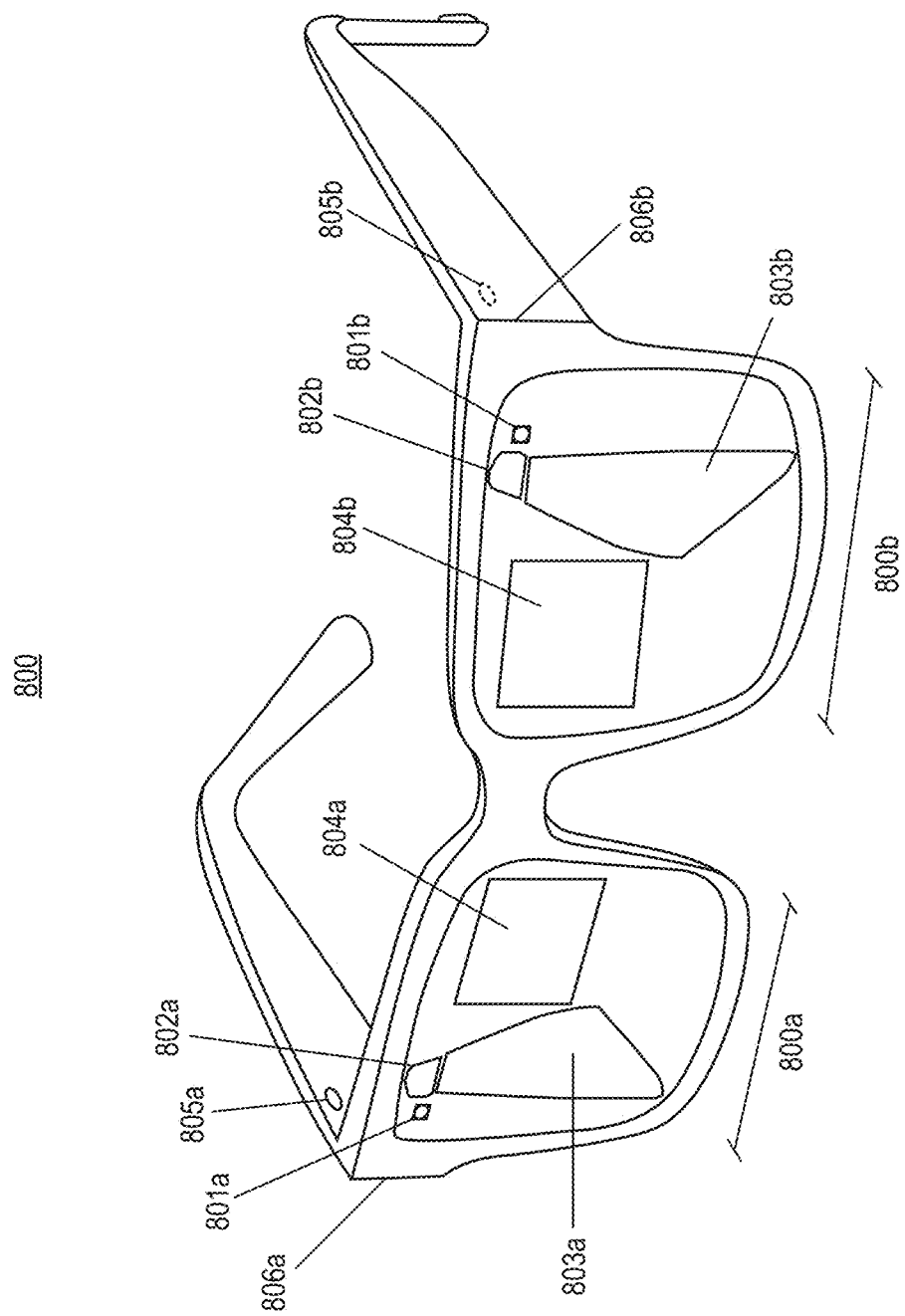
FIG. 8 illustrates a diagram of a back-mounted arrangement for a display system in a shape of eyeglasses, according to an example.

FIG. 8 illustrates a diagram of a back-mounted arrangement for a display system 800 in a shape of eyeglasses, according to an example. In some examples, the display system 800 may include a right waveguide configuration 800a and a left waveguide configuration 800b. Each of the right waveguide configuration 800a and the left waveguide configuration 800b shown here may be similar to the waveguide configuration 600 of FIG. 6. For example, each of the waveguide configurations, as shown in FIG. 8, may use similar types of volume Bragg gratings (VBGs) arrangements to those shown in FIG. 6. For instance, the right waveguide configuration 800*a* may include an input volume Bragg grating (VBG) 801*a*, a first middle volume Bragg grating (VBG) 802*a*, a second middle volume Bragg grating (VBG) 803*a*, and an output volume Bragg grating (VBG) 804*a*, and the left waveguide configuration 800*b* may include an input volume Bragg grating (VBG) 801*b*, a first middle volume Bragg grating (VBG) 802*b*, a second middle volume Bragg grating (VBG) 803*b*, and an output volume Bragg grating (VBG) 804*b*.

With regard to the right waveguide configuration 800*a*, in some examples, a right projector 805*a* may be mounted at an interior side of a right temple arm 806*a* of the display system 800. In some examples, the right projector 805*a* may propagate light to and/or through the input volume Bragg grating (VBG) 801*a* to the first middle volume Bragg grating (VBG) 802*a* and the second middle volume Bragg grating (VBG) 803*a* and then to the output volume Bragg grating (VBG) 804*a*.

With regard to the left waveguide configuration 800*b*, in some examples, a left projector 805*b* may be mounted at an interior side of a left temple arm 806*b* of the display system 800. In some examples, the left projector 805*b* may propagate light to and/or through the input volume Bragg grating (VBG) 801*b* to the first middle volume Bragg grating (VBG) 802*b* and the second middle volume Bragg grating (VBG) 803*b* and then to the output volume Bragg grating (VBG) 804*b*.

Accordingly, in some examples, the right waveguide configuration 800*a* and the left waveguide configuration 800*b* may present a first display image and a second display image, respectively, to be viewed by a user's respective eye, when wearing the eyewear, to generate a simultaneous, "binocular" viewing. That is, in some examples, the first image projected by the right projector 805*a* and the second image projected by the left projector 805*b* may be uniformly and symmetrically "merged" to create a binocular visual effect for a user. It may be appreciated that such an arrangement may provide various benefits to a user.

However, in some instances, providing that binocular visual effect may not be easy. For instance, there may be any number of disparities between a first image projected by a first projector and second image projected by a second projector. As mentioned above, these disparities may be the result of unmerged or displaced images. When this occurs, a user wearing the eyewear may experience, among other things, poor visual acuity and significant visual discomfort, which can result in dizziness, eye fatigue, or other side effects.

One example of such a disparity may be a misalignment. As used herein, "misalignment" may include any non-uniformity that may result from a projection of a first image by a first projector and a second image by a second projector. So, in one example, a misalignment may occur if a first image projected by a first projector may be higher relative to a second image projected by a second projector. If a first image projected by a first projector and second image projected by a second projector is misaligned, the combined binocular image may not be acceptable to the user, and the user may experience significant discomfort, resulting in dizziness and visual (i.e. eye) fatigue.

It should be appreciated that such misalignment(s) may be of various types. Examples may include any number of displacements, distortions, or unaligned/unmerged images.

In some examples, a misalignment may be present between one or more projection elements (e.g., projectors) of a display projection assembly and one or more waveguide configurations in the display projection assembly or display system. In these examples, the one or more projection elements may be static with respect to each other. In other examples, a misalignment may be present between one or more lenses or display panels of a display projection assembly or display system, wherein one or more projection elements (e.g., projectors) may be misaligned relative to each other. In further examples, a misalignment may be present as a result of a low-order deformation of a waveguide configuration included in a display projection assembly or display system. Other issues that may arise as a result of misalignment may include orientation issues, such as "tilt" and "tip." In some examples, "tip" or "tilt" of a waveguide configuration may induce visual disparities and/or misalignments, and may require extremely tight (i.e., small) tolerances for operation. It should be appreciated that in addition to these types of misalignment(s), other disparities associated with a display system may also be addressed herein as well. These may include, but not limited to, any shift, rotation, displacement, distortion, or other perceived disparity characteristics that requires correction for proper viewing by a user. Moreover, it should be appreciated that active detection and correction may, in some cases, be essential to enable a back-mounted arrangement for a display system.

It should be appreciated that, in some examples, only light that may travel to, through and out of one or more waveguides of a display system may be utilized for viewing by a user (i.e., used light or "display light"). So, in an example where a waveguide may include a first arrangement of volume Bragg gratings (VBGs) and a second arrangement of volume Bragg gratings (VBGs), light that may travel through (i.e., be diffracted by) the first arrangement of volume Bragg gratings (VBGs) but may not travel through (i.e., be diffracted by) the second arrangement of volume Bragg gratings (VBGs) may be unused. Put another way, in some examples, light that may travel through the first arrangement of volume Bragg gratings (VBGs) and the second arrangement of volume Bragg gratings (VBGs) may be required to meet the Bragg conditions for the first arrangement of volume Bragg gratings (VBGs) and the second arrangement of volume Bragg gratings (VBGs), and light that may not meet the Bragg conditions for one or more of the first arrangement of volume Bragg gratings (VBGs) and the second arrangement of volume Bragg gratings (VBGs) may remain unused.

In some examples, a disparity sensing port may be located to receive unused light. In particular, in some examples and as discussed further below, the disparity sensing port may be located in relation to a waveguide to enable receipt of unused light propagating to and/or within the waveguide. So, in one example involving a display system in the form of eyeglasses, a disparity sensing port may be located on bridge (i.e., to be set on a user's nose) of the eyeglasses.

In some examples, a disparity sensing port may receive unused light and may pass the unused light to various elements of a display system. In some examples, these various elements of the display system may analyze the unused light to address and/or correct disparities. For example, in some instances, the disparity sensing port may direct the unused light to a disparity sensing detector, which may be utilized to analyze the unused light to determine and/or correct a disparity. Examples of disparity sensing detectors include sensors, such as photodetectors or image sensors, that may be utilized to detect various aspects of propagated light.

More specifically, in some examples, a first disparity sensing port associated with a first (e.g., left) projector may receive unused light from a first waveguide associated with the first projector. Also, in some examples, a second disparity sensing port associated with a second (e.g., right) projector may receive unused light from a second waveguide associated with the second projector. Furthermore, in some examples, the unused light received by the first disparity sensing port and the unused light received by the second disparity sensing port may then be analyzed to determine a disparity associated with the display system. In addition, the unused light received by the first disparity sensing port and the unused light received by the second disparity sensing port may be utilized to measure a degree or extent of the disparity and to correct the disparity as well. Accordingly, it may be appreciated that the systems and methods described herein may be utilized to enable "back-mounted" projectors for a variety of display systems, and may act as a "third eye" to correct disparities in these variety of display systems.

Figure 9:
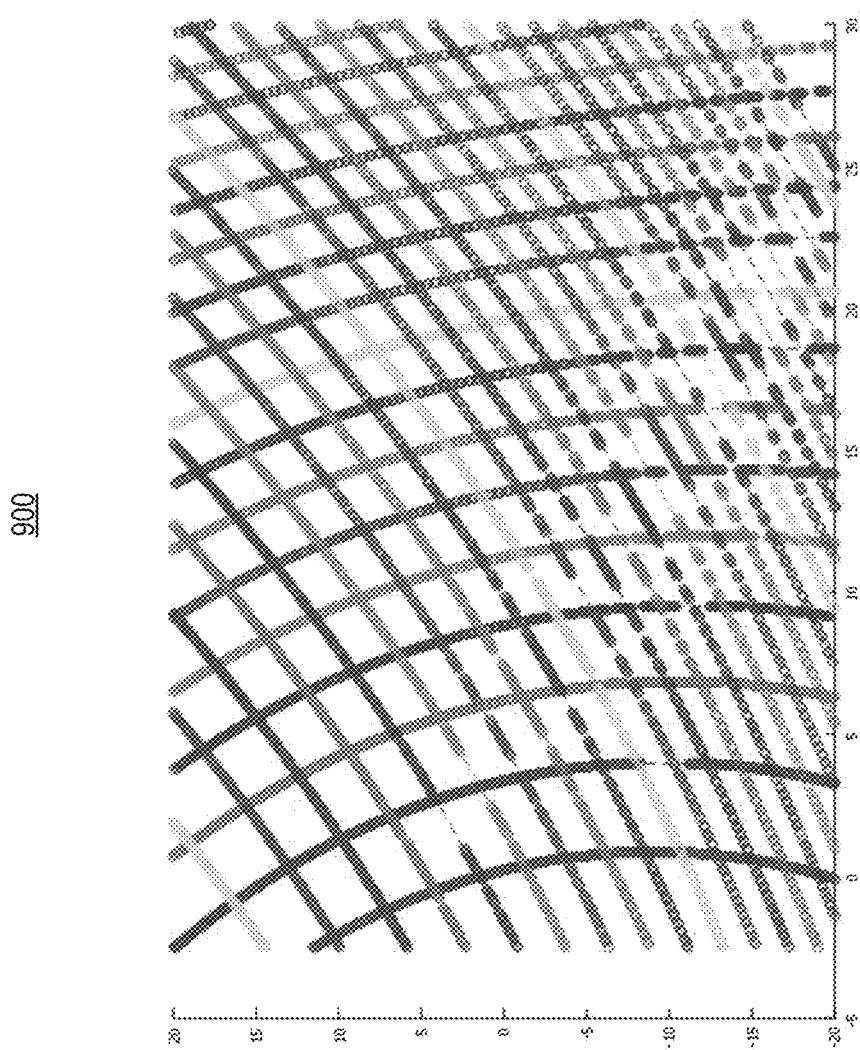
FIG. 9 illustrates a representation of various diffractions associated with on arrangement of gratings for one fixed wavelength, according to an example.

FIG. 9 illustrates a representation 900 of various diffractions associated with on arrangement of gratings for one fixed wavelength, according to an example. In this example, the unit associated x-axis and the unit associated with the y-axis may be degrees. In this example, the first vertical lines may correspond to a first arrangement of gratings (e.g., an in-coupling grating) and the horizontal lines may correspond to a second arrangement of gratings (e.g., a middle grating). In this example, the first arrangement of gratings and the second arrangement of gratings may be included in a waveguide and may employ differing gratings structures.

In this example, light that meet a Bragg condition for both the first arrangement of gratings and the second arrangement of gratings may be represented by an intersection of a vertical line and a horizontal line (i.e., both Bragg conditions are met). In some instances, this may represent light that may be "used". Furthermore, in this example, light that may be represented on a line in between two intersections may not travel through and out of the waveguide (i.e., "unused" light). In addition, in this example, light that may be represented as not on a line (i.e., in between vertical lines and horizontal lines) may not travel through and out of the waveguide (i.e., "unused" light) as well. So, in an instance where a projector (e.g., a light-emitting diode (LED) projector) may provide a broadband light source, each wavelength associated with the broadband light source may have used and unused light in a similar manner.

In this example, unused light may be received by a disparity sensing port and may be provided to a disparity sensing detector for use in detecting and/or correcting a disparity in a display device. That is, since (in some examples) a significant amount of light typically projected by a projector in a display system may be unused and since the unused light may include a same field of view (FOV) information as light being viewed by a user, the systems and methods described herein may utilized this unused light to analyze and correct disparities.

By utilizing the unused light, the systems and methods described herein may obviate a need for a dedicated source of display information that may require additional fabrication (i.e., manufacturing steps). Moreover, in some examples, since the systems and methods described herein may utilize the unused light for disparity analysis and correction, there may be none or minimal interference(s) between display path and disparity sensing paths.

Figure 10:
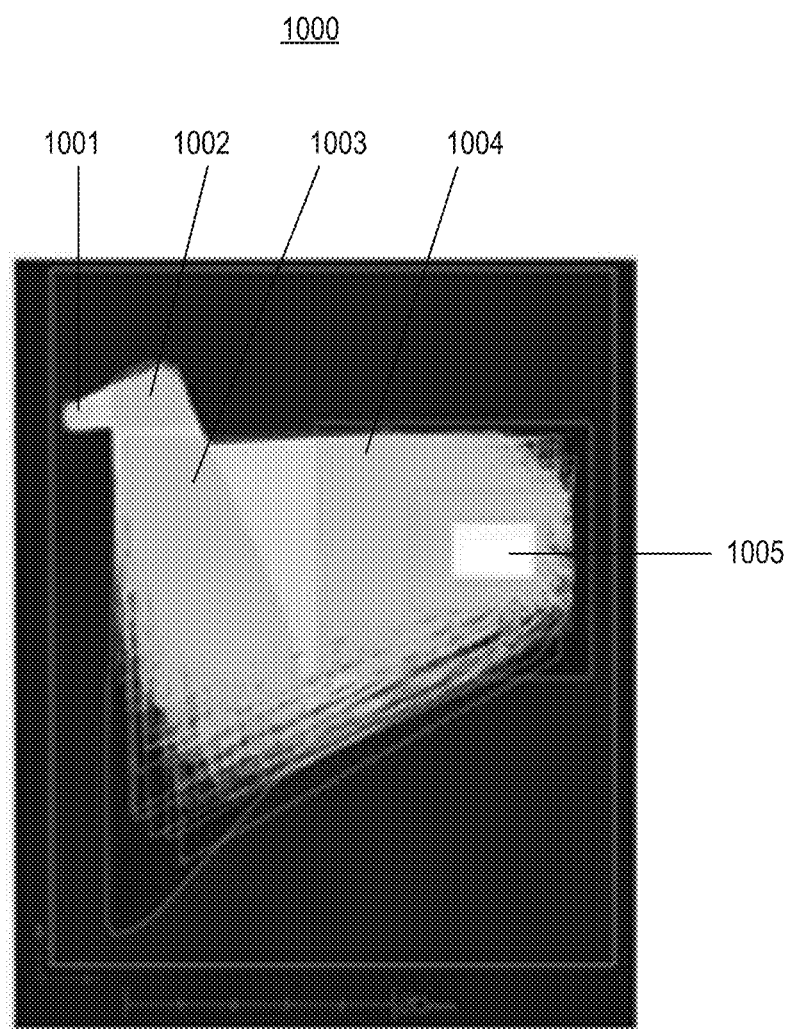
FIG. 10 illustrates a diagram depicting light traveling through a waveguide configuration, according to an example.

FIG. 10 illustrates a diagram depicting light traveling through a waveguide configuration 1000, according to an example. Unlike FIG. 6, where a single light wave is indicated by an arrow, FIG. 10 illustrates a full spectrum of propagated light beams and sample points associated with an entire supported (i.e., angular) field of view (FOV). As discussed further below, in some examples, the waveguide configuration 1000 may include similar types of volume Bragg grating (VBG) arrangements to those shown in FIG. 6.

In this example, the waveguide configuration 1000 may include input volume Bragg grating (VBG) 1001, a first middle volume Bragg grating (VBG) 1002, a second middle volume Bragg grating (VBG) 1003 and an output volume Bragg grating (VBG) 1004.

In this example, light may be emitted from a projector (not shown) towards the input volume Bragg grating (VBG) 1001. The input volume Bragg grating (VBG) 1001 may direct the light towards the first middle volume Bragg grating (VBG) 1002 and the second middle volume Bragg grating (VBG) 1003, and then towards the output volume Bragg grating (VBG) 1004. Also, in this example, eyebox 1005 may represent an amount and a path (i.e., a display sensing path) of light that may be transmitted for viewing by a user (i.e., used).

Accordingly, it may be appreciated that light that may be transmitted for viewing by a user indicated outside of the eyebox 1005 may be utilized for disparity sensing. Moreover, it may be appreciated that there may be no or minimal interference between a display path and a disparity sensing path.

Figure 11A:
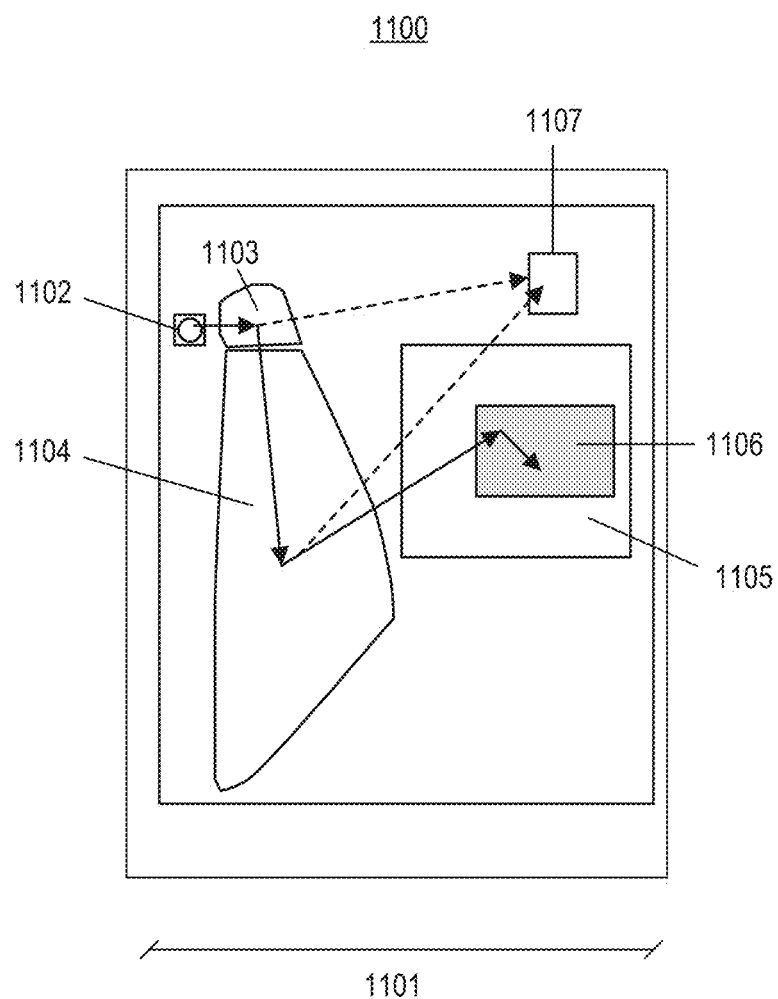
FIGS. 11A-B illustrates a display system having a disparity sensing port, according to an example.
Figure 11B:
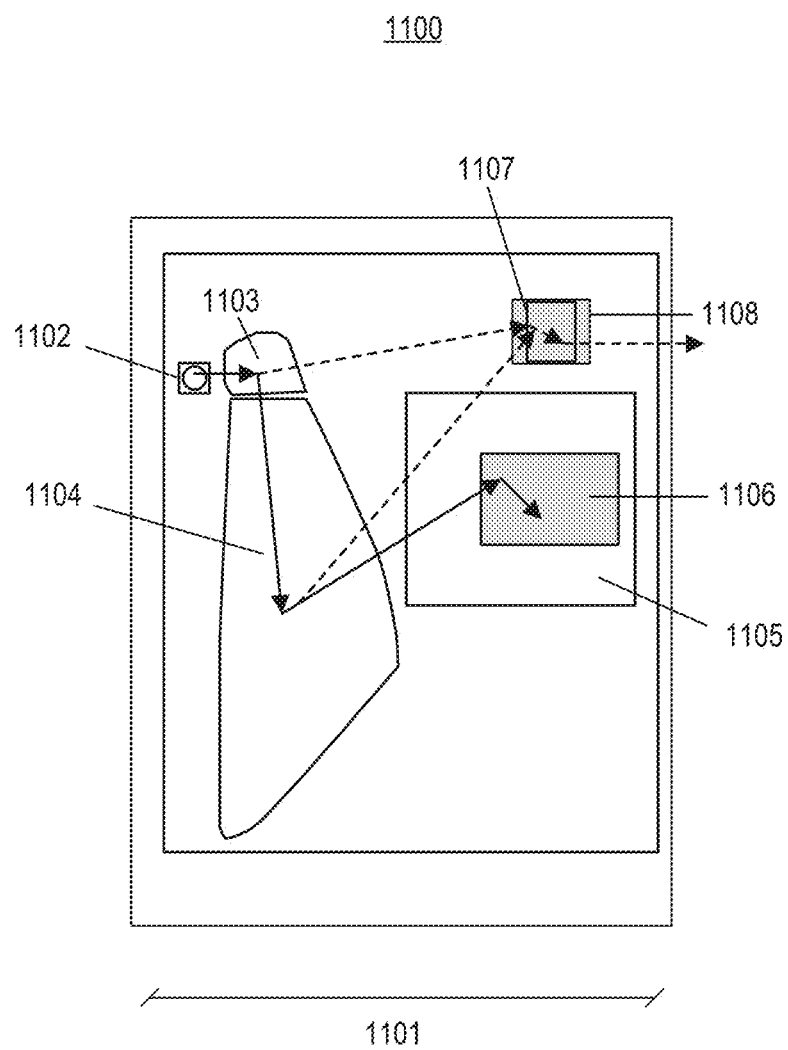

FIGS. 11A-B illustrates a display system 1100 having a disparity sensing port, according to an example. FIGS. 11A and 11B illustrate an eye-side view of the display system 1100 including a waveguide 1101 having a plurality of volume Bragg gratings (VBGs) 1102-11051.

In some examples and as shown in FIGS. 11A and 11B, similar to the previous examples, a projector (not shown) may propagate light to a first input volume Bragg grating (VBG) 1102. The first input volume Bragg grating (VBG) 1102 may then direct the propagated light toward first middle volume Bragg grating (VBG) 1103, and then to second middle volume Bragg grating (VBG) 1104. The propagated light may then travel from the second middle volume Bragg grating (VBG) toward the output volume Bragg grating (VBG) 1105, which may direct the propagated light towards an eyebox 1106. In some examples, the eyebox 1106 may represent a two-dimensional box in front of the user's eye from which a projected image may be viewed. In some examples, the eyebox 1106 may be located 10 millimeters (mm) to 20 millimeters (mm) away from (i.e., in front of) a surface of the waveguide 1101.

In some examples, the disparity sensing port 1107 may be located to receive unused propagated light. In particular, in some examples, the disparity sensing port 1107 may be utilized to receive the unused propagated light so that a disparity sensing detector 1108 may analyze and/or correct disparities. In some examples, the disparity sensing port 1107 may be a waveguide configuration that may include one or more volume Bragg gratings (VBGs). In some examples, the disparity sensing port 1107 may be designed similarly to the input volume Bragg grating (VBG) 1102 and/or the output volume Bragg grating (VBG) 1105.

In some examples, the disparity sensing detector 1108 may be located behind the disparity sensing port 1107. Also, in some examples, the disparity sensing port 1107 may be located near a waveguide plate surface. So, in one example, a disparity sensing port 1107 may be located near the eyebox 1106. In another example, the disparity sensing port 1107 may be located above the output volume Bragg grating (VBG) 1105. In particular, in some examples, the disparity sensing port 1107 may be located between 2 millimeters (mm) and 10 millimeters (mm) above the output volume Bragg grating (VBG) 1105.

It should be appreciated that a location of the disparity sensing port 1107 may include anywhere that any unused light that may contain a same field of view (FOV) information as light that may be viewed by a user (i.e., used) may be obtained. In some examples, the disparity sensing port 1107 may be located to ensure receipt of an amount of unused light that may be sufficient for the disparity sensing detector 1108 to analyze and/or correct disparities. In one example, the disparity sensing port 1107 may be located to ensure receipt of a maximum amount of unused light. It should be appreciated that, in addition to receipt of an amount of unused light, the location of a disparity sensing port 1107 may be based on other criteria such as user experience associated with and weight and aesthetic of the display system 1100.

Figure 12A:
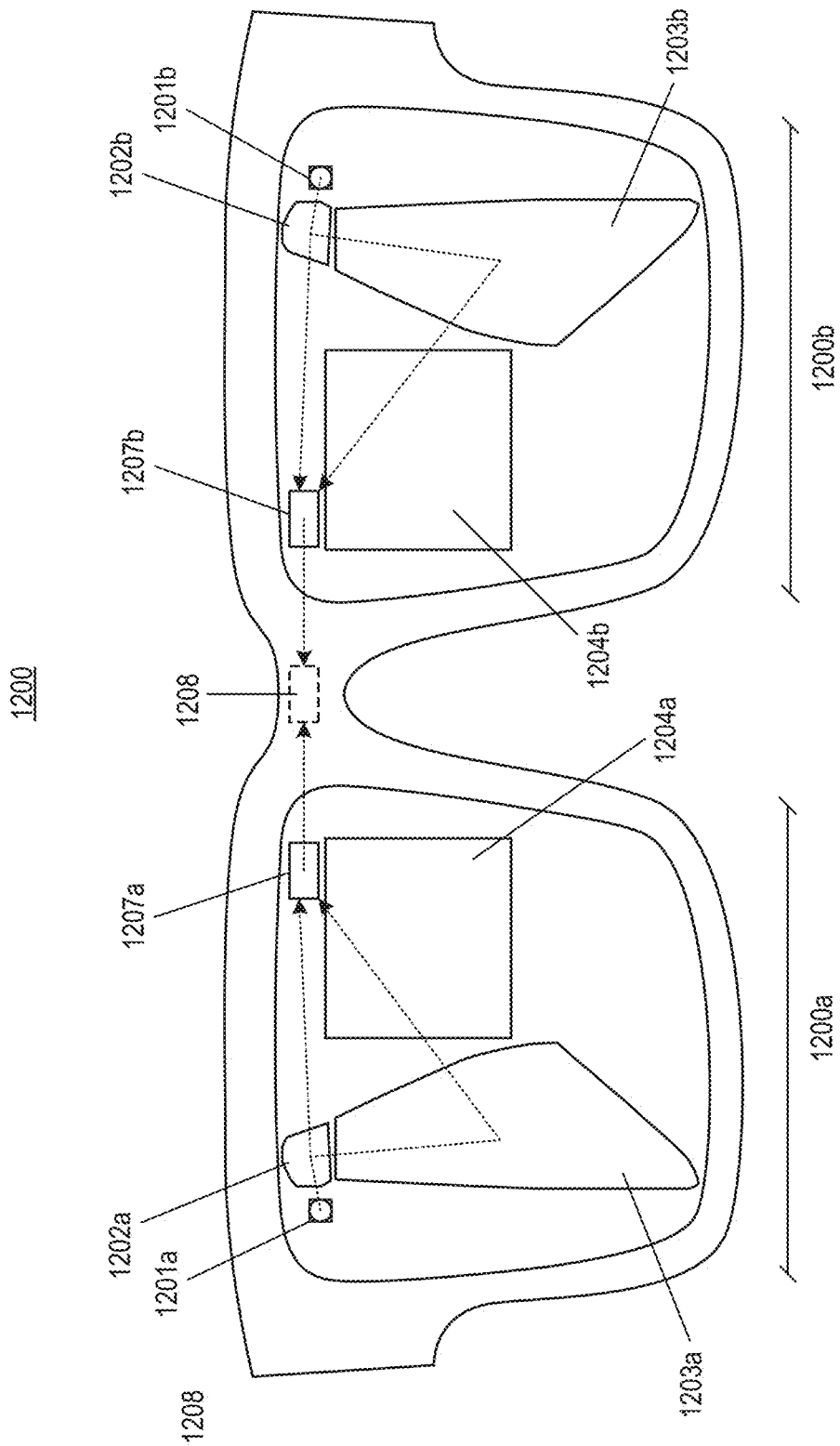
FIGS. 12A-C illustrates a display system having a disparity sensing port, according to another example.
Figure 12B:
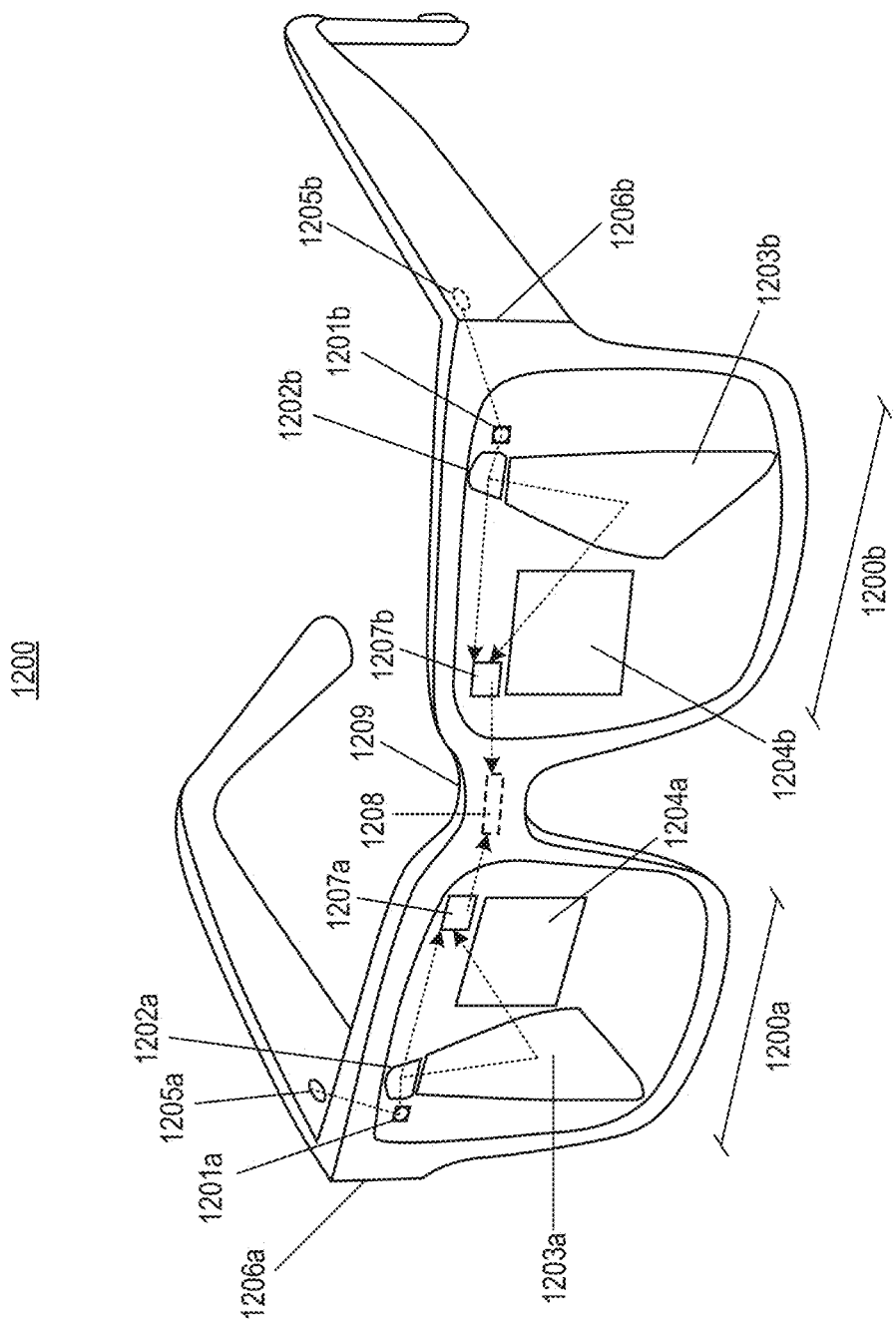
Figure 12C:
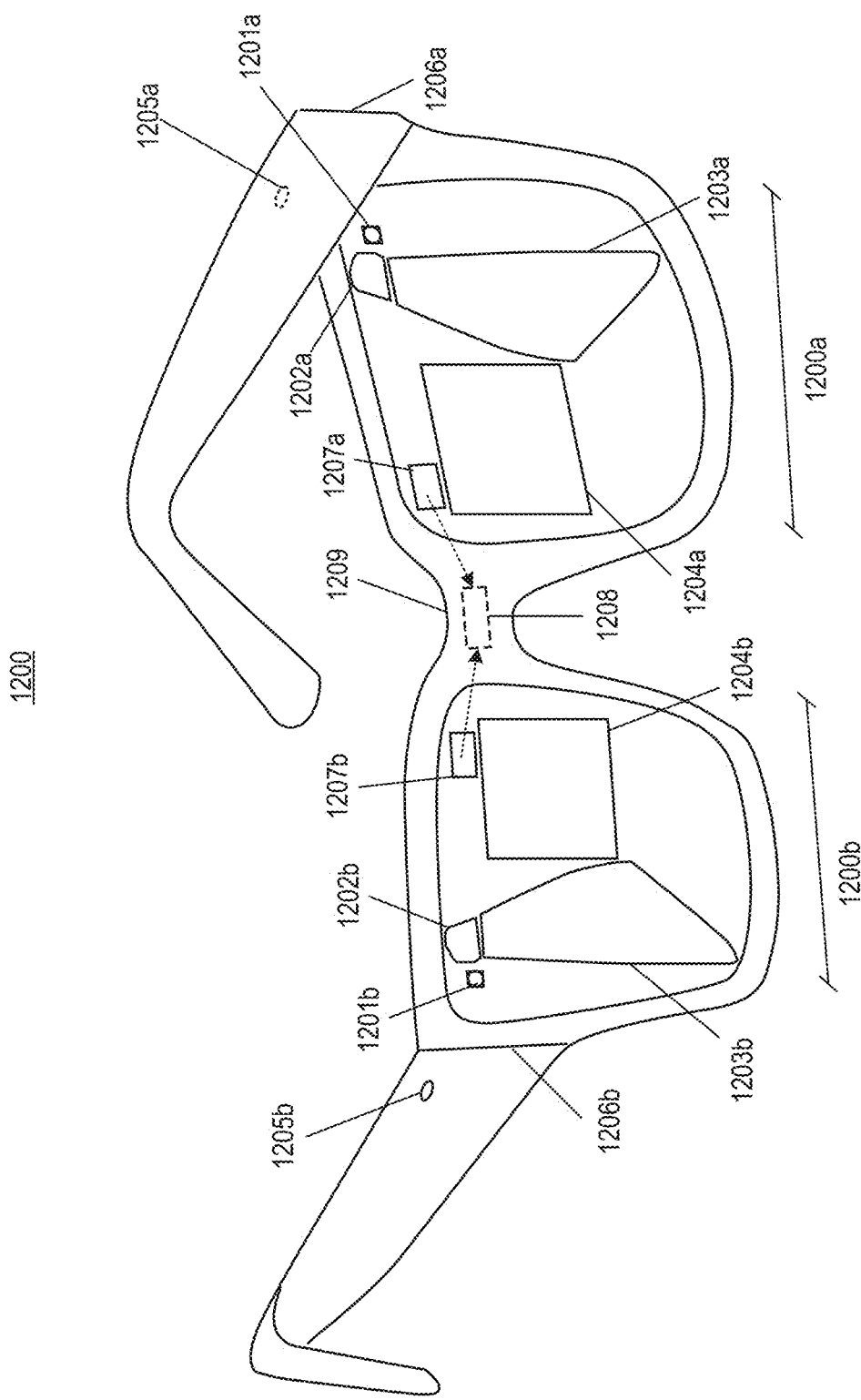

FIGS. 12A-C illustrates a display system 1200 having a disparity sensing port, according to another example. In this example, the display system 1200 may be a back-mounted display system in a shape of eyewear (e.g., eyeglasses or other wearable eyewear arrangement).

In some examples, the display system 1200 may include a right waveguide configuration 1200a and a left waveguide configuration 1200b. Each of the right waveguide configuration 1200a and the left waveguide configuration 1200b shown here may be similar to the right waveguide configurations 800a, 800b of FIG. 8.

In some examples, the right waveguide configuration 1200a may include an input volume Bragg grating (VBG) 1201a, a first middle volume Bragg grating (VBG) 1202a, a second middle volume Bragg grating (VBG) 1203a, and an output volume Bragg grating (VBG) 1204a. In some examples, the left waveguide configuration 1200b may include an input volume Bragg grating (VBG) 1201b, a first middle volume Bragg grating (VBG) 1202b, a second middle volume Bragg grating (VBG) 1203b, and an output volume Bragg grating (VBG) 1204b.

With regard to the right waveguide configuration 1200a and as shown in FIGS. 12B-C, in some examples, a right projector 1205a may be mounted at an interior side of a right temple arm 1206a of the display system 1200. In some examples, the right projector 1205a may propagate light to and/or through the input volume Bragg grating (VBG) 1201a to the first middle volume Bragg grating (VBG) 1202a and the second middle volume Bragg grating (VBG) 1203a and then to the output volume Bragg grating (VBG) 1204a.

With regard to the left waveguide configuration 1200b and as shown in FIGS. 12A-B, in some examples, a left projector 1205b may be mounted at an interior side of a left temple arm 1206b of the display system 1200. In some examples, the left projector 1205b may propagate light to and/or through the input volume Bragg grating (VBG) 1201b to the first middle volume Bragg grating (VBG) 1202b and the second middle volume Bragg grating (VBG) 1203b and then to the output volume Bragg grating (VBG) 1204b. In some examples, the first waveguide configuration 1200a and the right projector 1205a may be included in a first lens assembly of the display system 1200, and the second waveguide configuration 1200b and the left projector 1205b may be included in a second lens assembly of the display system 1200.

In some examples, the right projector 1205a and the left projector 1205b may be "front-mounted" to be located in front (i.e., away from the user's eye and towards a displayed image) of the right waveguide configuration 1200a and the left waveguide configuration 1200b respectively. In some examples, the right projector 1205a and the left projector 1205b may be "rear-mounted" to be located behind (i.e., closer to the user's eye and away from a displayed image) of the right waveguide configuration 1200a and the left waveguide configuration 1200b respectively.

In some examples, the display system 1200 may include a right disparity sensing port 1207a that may be located near a bridge 1209 of a nose. In some examples, the right disparity sensing port 1207a may be configured (e.g., located) to receive unused light that may propagate from the right projector 1205a. So, in some examples, the right disparity sensing port 1207a may receive (unused) light that may propagate through the input volume Bragg grating (VBG) 1201a, but not through the first middle volume Bragg grating (VBG) 1202a and the second middle volume Bragg grating (VBG) 1203a. In other examples, the right disparity sensing port may receive (unused) light that may propagate through the input volume Bragg grating (VBG) 1201a and through the first middle volume Bragg grating (VBG) 1202a, but not through the second middle volume Bragg grating (VBG) 1203a.

As discussed above, the right disparity sensing port 1207a and the left disparity sensing port 1207b may be designed as a waveguide configuration that may include one or more volume Bragg gratings (VBGs). Moreover, in some examples, the right disparity sensing port 1207a and the left disparity sensing port 1207b may be physically and/or functionally coupled in such a manner as to operate as one element.

In some examples, the display system 1200 may include a left disparity sensing port 1207b that may be located near the bridge of a nose 1209. In some examples, the bridge may couple a first lens assembly and a second lens assembly of the display system 1200. In some examples, the left disparity sensing port 1207b may be configured (e.g., located) to receive unused light that may propagate from the left projector 1205b. So, in some examples, the left disparity sensing port 1207b may receive (unused) light that may propagate through the input volume Bragg grating (VBG) 1201b, but not through the first middle volume Bragg grating (VBG) 1202b and the second middle volume Bragg grating (VBG) 1203b. In other examples, the left disparity sensing port may receive (unused) light that may propagate through the input volume Bragg grating (VBG) 1201b and through the first middle volume Bragg grating (VBG) 1202b, but not through the second middle volume Bragg grating (VBG) 1203b.

In some examples, the right disparity sensing port 1207a may receive unused light from the right projector 1205a and the left disparity sensing port 1207b may receive unused light from the left projector 1205b, and may direct the unused light from these sources to a disparity sensing detector 1208. So, in some examples, the right disparity sensing port 1207a and the left disparity sensing port 1207b may be configured to receive and provide (e.g., "funnel" or "channel") the unused light to the disparity sensing detector 1208.

In particular, in some examples, the right disparity sensing port 1207a may receive and provide unused light that may travel through the input volume Bragg grating (VBG) 1201*a*, but may not travel through the first middle volume Bragg grating (VBG) 1202*a* or the second middle volume Bragg grating (VBG) 1203*a*. Also, in some examples, the left disparity sensing port 1207*b* may receive and provide unused light that may travel through the input volume Bragg grating (VBG) 1202*a* and the first middle volume Bragg grating (VBG) 1202*b*, but may not travel through the second middle volume Bragg grating (VBG) 1203*b*.

In some examples, the disparity sensing detector 1208 may be located on a bridge 1209 of a nose. Also, in some examples, the right disparity sensing port 1207*a* and the left disparity sensing port 1207*b* may be located sufficiently near the bridge of a nose 1209 so as to be able to direct unused light to the disparity sensing detector 1208.

It should be appreciated that the disparity sensing port may take any form that may be sufficient to receive light (e.g., unused light) that may be propagated by a projector and/or through a waveguide. In some examples, the right disparity sensing port 1207*a* and the left disparity sensing port 1207*b* may include a volume Bragg grating (VBG) that may direct the unused light to any number of intermediary arrangement of collection optics (not shown), which may then further direct the unused light to the disparity sensing detector 1208. In some examples, the collection optics may include a disparity sensing camera (not shown), which may receive unused light (as described above), and may operate in association with the disparity sensing detector 1208 for disparity analysis and correction. Also, in some examples, the right disparity sensing port 1207*a* and the left disparity sensing port 1207*b* may provide received unused light to a combiner (not shown) that may further provide the unused light to the disparity sensing detector 1208.

It may be appreciated that locating the disparity sensing detector 1208 on the bridge of a nose 1209 may be chosen to enhance aesthetic aspects of the display system 1200 while ensuring sufficient receipt of unused light. In some examples, and as discussed further below, the disparity sensing may include or may be operated in association with a combiner (not shown) that may combine unused light from the right projector 1205*a* and the left projector 1205*b*.

In some examples, the right disparity sensing port 1207*a* and the left disparity sensing port 1207*b* may be sized according to various criteria as well. For example, it may be appreciated that there may be a relationship between a size of the right disparity sensing port 1207*a* and/or the left disparity sensing port 1207*b* (i.e., how much light it may collect) and a field of view (FOV) that may be associated with a display device. For example, in some instances, a smaller size for the right disparity sensing port 1207*a* and/or the left disparity sensing port 1207*b* may result in a smaller field of view (FOV) that may be supported. Also, in some examples, a design of aspects associated with the right disparity sensing port 1207*a* and/or the left disparity sensing port 1207*b* may be required balancing of various criteria. For example, in some instances, a size of the right disparity sensing port 1207*a* and/or the left disparity sensing port 1207*b* may be selected to provide a field of view (FOV) that may sufficient or required for disparity sensing. Also, in some examples, a distance between the right disparity sensing port 1207*a* and/or the left disparity sensing port 1207*b* and one or more volume Bragg gratings (VBGs) 1201*a*-1204*a* (e.g., the input volume Bragg grating (VBG) 1201*a*) and 1201*b*-1204*b* (e.g., the input volume Bragg grating (VBG) 1201*b*) may be selected to provide a field of view (FOV) that may sufficient or required for disparity sensing as well. In particular, in some examples, a larger size and a closer distance may be implemented to provide a larger field of view (FOV).

In some examples, the right projector 1205*a* or the left projector 1205*b* may filter or selectively emit some propagated light. In these instances, the right disparity sensing port 1207*a* and the left disparity sensing port 1207*b* may nevertheless be configured to receive a portion of unused light that may be sufficiency for disparity analysis and correction. Indeed, in some examples, aspects (e.g., an amount, one or more types, etc.) of propagated light from the right projector 1205*a* or the left projector 1205*b* may be optimized to ensure sufficient unused light for disparity analysis and correction, while nevertheless minimizing power usage by the display 1200.

Figure 13:
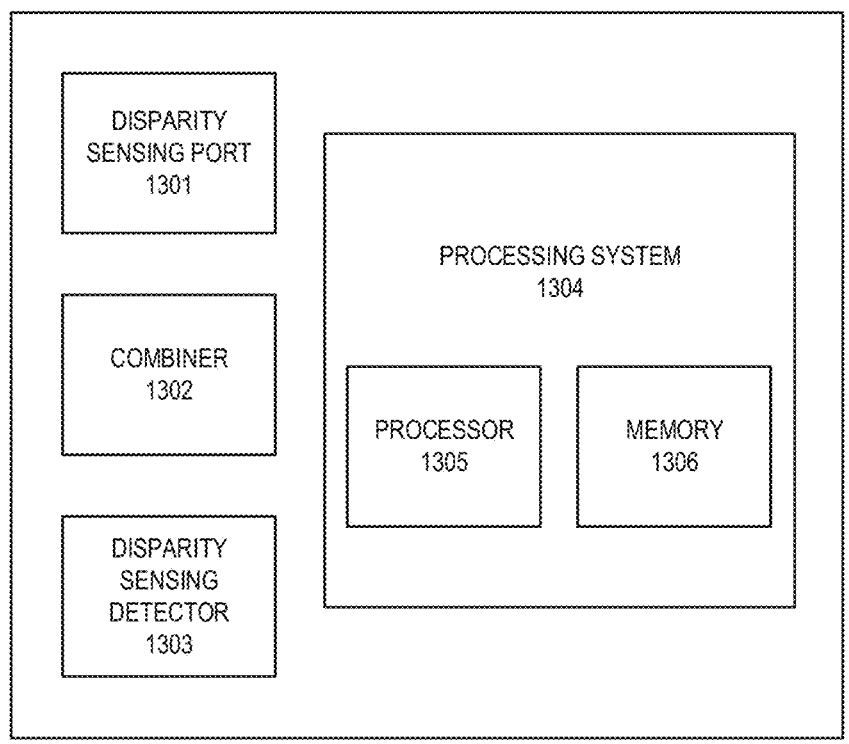
FIG. 13 illustrates a block diagram of a disparity sensing system to analyze and/or correct a disparity in a display system, according to an example.

FIG. 13 illustrates a block diagram of a disparity sensing system 1300 to analyze and/or correct a disparity in a display system, according to an example. In some examples, the elements of the disparity sensing system 1300 may each be included in the display system, while in other examples, some of the elements may not be included in the display system.

In some examples, the disparity sensing system 1300 may include a disparity sensing port 1301. As discussed above, in some examples, the disparity sensing port 1301 may be configured to receive light propagated associated with one or more sources (e.g., one or more waveguides, etc.).

In some examples, the disparity sensing system 1300 may include a combiner 1302. In some examples, the combiner 1302 may combine light propagated from a first source (e.g., a first waveguide) and a second source (e.g., a second waveguide) for analysis.

In some examples, the disparity sensing system 1300 may include a disparity sensing detector 1303. Examples of the disparity sensing detector 1303 include one or more cameras, one or more light sensors and/or other photodetectors. In some examples, the disparity sensing detector 1303 may be utilized to gather measurement data related to a disparity associated with the display system.

In some examples, the disparity sensing system 1300 may include a processing system 1304. In some examples, the processing system 1304 may include a processor 1305 and a memory 1306. Also, in some examples, the processing system 1304 may also include imaging and collection optics, as discussed further below. In some examples, the memory 1306 (e.g., a non-transitory memory) may include instructions which, when executed by the processor, may cause the processor to determine whether a disparity may exist (e.g., if an image projected by a first projector may be same as an image projected by a second projector), determine an amount or degree associated with the disparity (e.g., an angular divergence), and determine a response (e.g., an adjustment) to with the disparity. For example, in some instances, the processing system 1304 may determine that an adjustment may be made to shift an image (i.e., a shifting) projected by a right projector by a specified amount (e.g., one degree)(1°) to ensure overlap with an image projected by a left projector.

Figure 14:
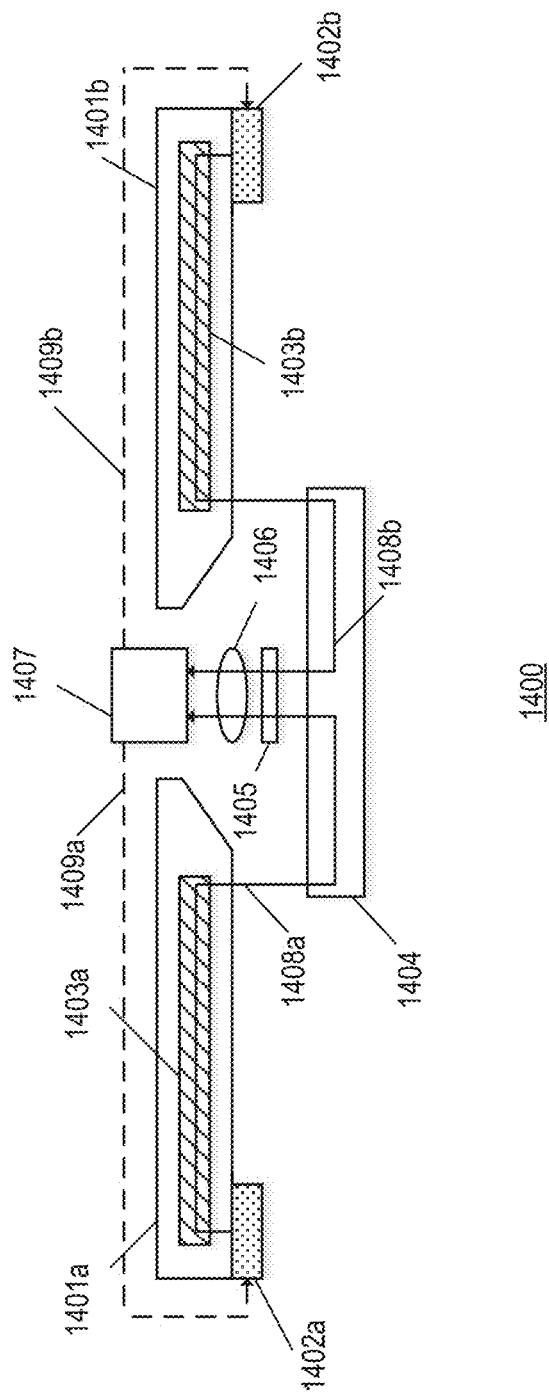
FIG. 14 illustrates a diagram of a display system 1400 including a disparity sensing system, according to an example.

FIG. 14 illustrates a diagram of a display system 1400 including a disparity sensing system, according to an example. In some examples, the display system 1400 may include a left lens arrangement 1401*a* including a left projector 1402*a* and a left waveguide configuration 1403*a* (e.g., similar to the left waveguide configuration 1200*b*). In addition, in some examples, the display system 1400 may include a right lens arrangement 1401*b* including a right projector 1402*b* and a left waveguide configuration 1403*b*.

In some examples, the display system 1400 may also include a disparity sensing port 1404, an electronic shutter 1405, a camera 1406 and collection and imaging optics 1407.

In some examples, the left projector 1402a may project light (indicated by the arrow 1408a) towards the left waveguide configuration 1403a, wherein unused light from the light projected by the left projector 1402a may be received by the disparity sensing port 1404, as discussed above. In some examples, the disparity sensing port 1404 may be a waveguide configuration that may include one or more volume Bragg gratings (VBGs). In addition, in some examples, the right projector 1402b may project light (indicated by the arrow 1408b) towards the right waveguide configuration 1403b, wherein unused light from the light projected by the right projector 1402b may be received (i.e., combined) by the disparity sensing port 1404 as well. It should be appreciated that in some examples, where the display system 1400 may be a piece of eyewear (e.g., eyeglasses), inclusion of the disparity sensing port 1404 may reduce frame thickness of the eyewear by three (3) to five (5) millimeters, and may reduce the weight of the display system 1400 by several grams.

In some examples, upon receiving the unused light from the left projector 1402a and the unused light from the right projector 1402b, the disparity sensing port 1404 may propagate the unused light from the left projector 1402a and the unused light from the right projector 1402b towards the electronic shutter 1405 and the camera 1406. In some examples, the camera may capture the unused light from the left projector 1402a and the unused light from the right projector 1402b. In some examples, the captured light may then be utilized by the collection and imaging optics 1407 to determine whether a disparity may exist, determine an amount or degree associated with the disparity (e.g., an angular separation between an image projected by the left projector 1402a and an image projected by the right projector 1402b), and determine a response (e.g., an adjustment) to with the disparity.

In some examples, the collection and imaging optics 1407 may determine that an adjustment may be made to shift an image projected by the left projector 1402a by a specified amount to ensure overlap with an image projected by the right projector 1402b. In these examples, upon determining the adjustment, the collection and imaging optics 1407 may send a first feedback signal (indicated by the arrow 1409a) to the left projector 1402a and/or a second feedback signal (indicated by the arrow 1409b) to the right projector 1402b. In some examples, the first feedback signal and/or the second feedback signal may enable mitigation or correction (i.e., removal) of the disparity.

Figure 15:
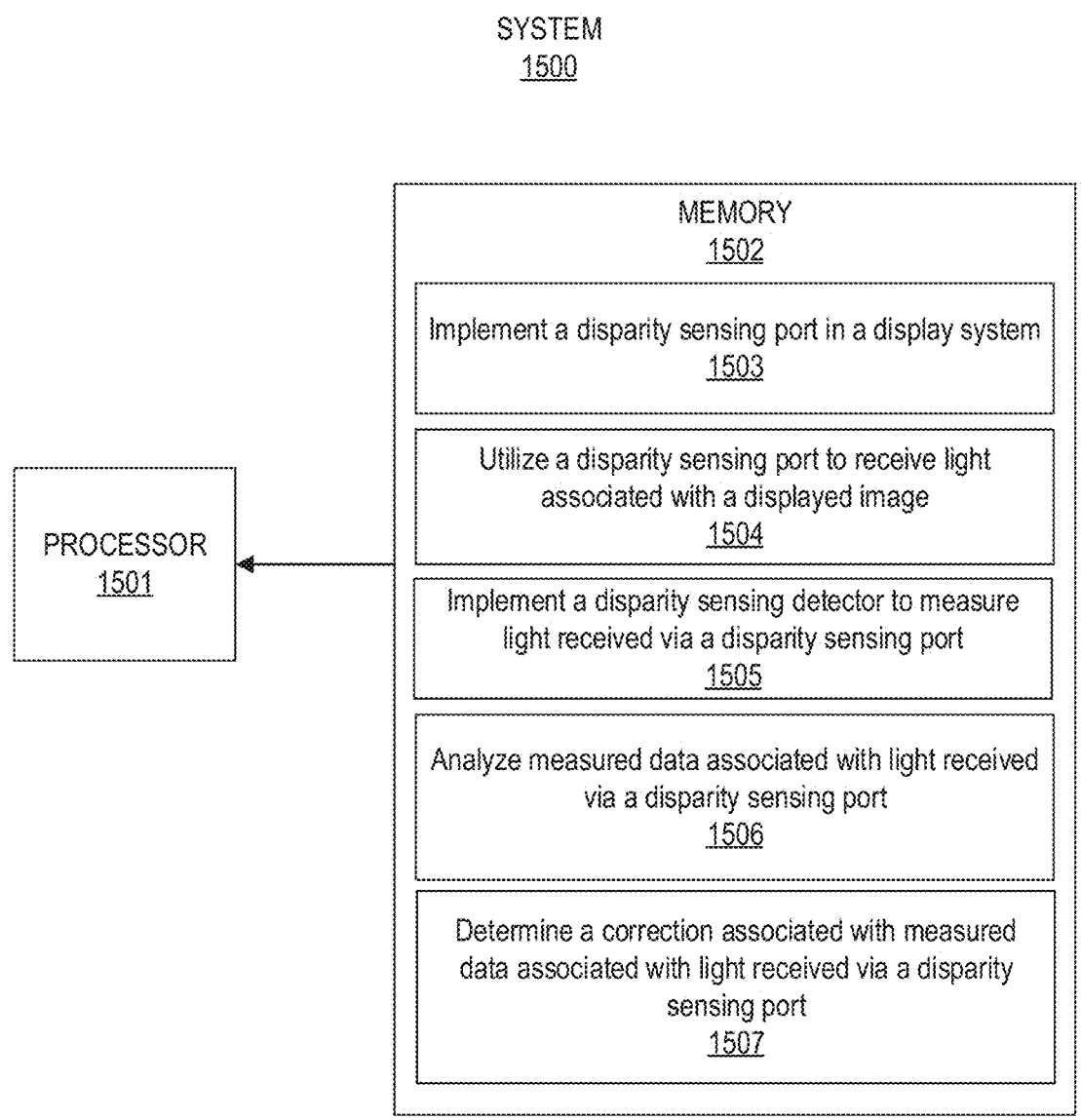
FIG. 15 illustrates a block diagram of a system to detect, analyze and correct of disparities in display systems utilizing disparity sensing ports, according to an example.

FIG. 15 illustrates a block diagram of a system 1500 to detect, analyze and correct of disparities in display systems utilizing disparity sensing ports, according to an example. As shown in FIG. 15, the system 1500 may include processor 1501 and the memory 1502. In some examples, the processor 1501 may be configured to execute the machine-readable instructions stored in the memory 1502. It should be appreciated that the processor 1501 may be a semiconductor-based microprocessor, a central processing unit (CPU), an application specific integrated circuit (ASIC), a field-programmable gate array (FPGA), and/or other suitable hardware device.

In some examples, the memory 1502 may have stored thereon machine-readable instructions (which may also be termed computer-readable instructions) that the processor 1501 may execute. The memory 1502 may be an electronic, magnetic, optical, or other physical storage device that contains or stores executable instructions. The memory 1502 may be, for example, random access memory (RAM), an Electrically Erasable Programmable Read-Only Memory (EEPROM), a storage device, an optical disc, or the like. The memory 1502, which may also be referred to as a computer-readable storage medium, may be a non-transitory machine-readable storage medium, where the term "non-transitory" does not encompass transitory propagating signals. It should be appreciated that the memory 1502 depicted in FIG. 15 may be provided as an example. Thus, the memory 1502 may or may not include additional features, and some of the features described herein may be removed and/or modified without departing from the scope of the memory 1502 outlined herein.

It should be appreciated that, and as described further below, the processing performed via the instructions on the memory 1502 may or may not be performed, in part or in total, with the aid of other information and data. Moreover, and as described further below, it should be appreciated that the processing performed via the instructions on the memory 1502 may or may not be performed, in part or in total, with the aid of or in addition to processing provided by other devices.

In some examples, the memory 1502 may store instructions, which when executed by the processor 1501, may cause the processor to: implement 1503 a disparity sensing port in a display system; utilize 1504 a disparity sensing port to receive light associated with a displayed image; implement 1505 a disparity sensing detector to measure light received via a disparity sensing port; analyze 1506 measured data associated with light received via a disparity sensing port; and determine 1507 a correction associated with measured data associated with light received via a disparity sensing port.

In some examples, the instructions 1503 may implement a disparity sensing port in a display system. In some examples, this may include providing (i.e., fabricating) a disparity sensing port as part of a display system. So, in an example where the display system may be a piece of eyewear (e.g., eyeglasses), the disparity sensing port may be provided on a bridge of a nose of the piece of eyewear.

In some examples, the instructions 1504 may utilize a disparity sensing port to receive light associated with a displayed image. So, in some examples and as discussed above, the instructions 1504 may enable receipt of light propagating through a waveguide that may be unused.

In some examples, the instructions 1505 may implement a disparity sensing detector to measure light received via a disparity sensing port. So, in some examples, the instructions 1505 may enable a disparity sensing detector to measure aspects of unused light that may be received by a disparity sensing port.

In some examples, the instructions 1506 may analyze measured data associated with light received via a disparity sensing port. In some examples, the instructions 1506 may analyze the measured data to determine issues associated with a displayed image. Examples of these issues may include misalignment, such as issues of tip and tilt.

In some examples, the instructions 1507 may determine a correction associated with the measured data associated with light received via a disparity sensing port. So, in some examples, the instructions 1507 may determine that an adjustment may be made to shift an image projected by a right projector by one degree (1°) to ensure overlap with an image projected by a left projector.

Figure 16:
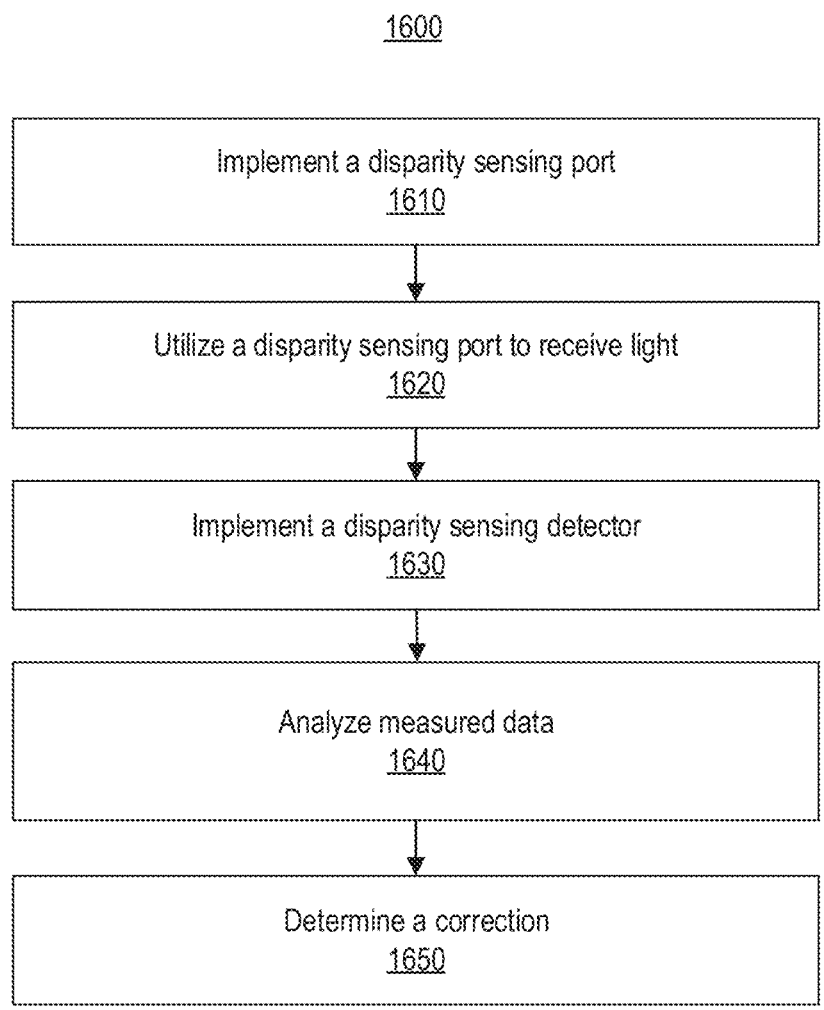
FIG. 16 illustrates a method for detection, analysis and correction of disparities in display systems utilizing disparity sensing ports, according to an example.

FIG. 16 illustrates a method for detection, analysis and correction of disparities in display systems utilizing disparity sensing ports, according to an example. The method 1600 is provided by way of example, as there may be a variety of ways to carry out the method described herein. Each block shown in FIG. 16 may further represent one or more processes, methods, or subroutines, and one or more of the blocks may include machine-readable instructions stored on a non-transitory computer-readable medium and executed by a processor or other type of processing circuit to perform one or more operations described herein.

Although the method 1600 is primarily described as being performed by system 1600 as shown in FIGS. 1A-B, the method 1600 may be executed or otherwise performed by other systems, or a combination of systems. It should also be appreciated that, in some examples, the method 1600 may be implemented in conjunction with a content platform (e.g., a social media platform) to generate and deliver content.

Reference is now made with respect to FIG. 10. At 1610, the processor 101 may implement a disparity sensing port in a display system. In some examples, this may include providing (i.e., fabricating) a disparity sensing port as part of a display system.

At 1620, the processor 101 may utilize a disparity sensing port to receive light associated with a displayed image. So, in some examples and as discussed above, the processor 101 may enable receipt of light that may be unused.

At 1630, the processor 101 may implement a disparity sensing detector to measure light received via a disparity sensing port. So, in some examples, the processor 101 may enable a disparity sensing detector to measure aspects of unused light that may be received by a disparity sensing port.

At 1640, the processor 101 may analyze measured data associated with light received via a disparity sensing port. In some examples, the processor 101 may analyze the measured data to determine issues associated with a displayed image.

At 1650, the processor 101 may determine a correction associated with the measured data associated with light received via a disparity sensing port.

In the following description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A display system, comprising:
a wearable eyewear arrangement, comprising:
a first lens assembly comprising:
a first projector to propagate first display light associated with a first image; and
a first waveguide for propagating the first image to a first eye of a user; and
a second lens assembly comprising:
a second projector to propagate second display light associated with a second image; and
a second waveguide for propagating the second image to a second eye of a user;
a bridge to couple the first lens assembly and the second lens assembly;
a disparity sensing port to receive the first display light and the second display light, wherein the first display light and the second display light are unused light; and
a processing system comprising:
a processor; and
a memory storing instructions, wherein the processing system is to:
compare the received first display light and the received second display light; and
determine, based on the comparison of the received first display light and the received second display light, at least one disparity associated with the first image and the second image.

2. The system of claim 1, wherein the wearable eyewear arrangement further comprises a disparity sensing detector to measure the first display light and the second display light.

3. The system of claim 1, wherein the first waveguide is comprised of a substrate and a photopolymer layer, and wherein the photopolymer layer includes one or more gratings.

4. The system of claim 3, wherein the one or more gratings are volume Bragg gratings (VBGs).

5. The system of claim 3, wherein the one or more gratings include an inbound volume Bragg grating (VBG), a first middle volume Bragg grating (VBG), a second middle volume Bragg grating (VBG) and an outbound volume Bragg grating (VBG).

6. The system of claim 3, wherein the one or more gratings are tiled.

7. The system of claim 1, wherein the disparity sensing port is located on the bridge of the wearable eyewear arrangement.

8. The system of claim 1, wherein the wearable eyewear arrangement further comprises:
a first temple arm, wherein the first projector is located near the first temple arm; and
a second temple arm, wherein the second projector is located near the second temple arm.

9. The system of claim 1, wherein the disparity is a misalignment between the first image propagated by the first waveguide and the second image propagated by the second waveguide.

10. The system of claim 9, wherein the processing system is to determine a correction comprising a shifting of one of the first image propagated by the first waveguide and the second image propagated by the second waveguide based on the misalignment.

11. An apparatus, comprising:
a first projector to propagate first display light associated with a first image;
a second projector to propagate second display light associated with a second image; and
a disparity sensing port to receive the first display light and the second display light to determine a disparity associated with the first image and the second image, wherein the first display light and the second display light are unused light.

12. The apparatus of claim 11, wherein the first projector is associated with a first lens and the second projector is associated with a second lens.

13. The apparatus of claim 12, wherein the first lens includes a waveguide comprising one or more volume Bragg gratings (VBGs).

14. The apparatus of claim 11, further comprising a disparity sensing detector to measure aspects of the first display light and the second display light.

15. A method for detecting a disparity in a display device, comprising:
implementing a disparity port in the display device;
utilizing the disparity port to receive light associated with an image displayed by the display device, wherein the light associated with the image is unused light; and
implementing a disparity sensing detector to measure the light associated with the image displayed by the display device.

16. The method of claim 15, further comprising:
analyzing measured data associated with the light associated with the image; and
determining a correction associated with the measured data to correct a disparity associated with the image displayed by the display device.

17. The method of claim 16, wherein the correction associated with the measured data is a shifting of an image projected by a lens of the display device.

18. The system of claim 1, wherein the disparity sensing port is located between two (2) millimeters (mm) and ten (10) millimeters (mm) above the first waveguide and the second waveguide.

19. The apparatus of claim 13, wherein the disparity sensing port is located between two (2) millimeters (mm) and ten (10) millimeters (mm) above the waveguide.

20. The method of claim 17, wherein the lens includes a waveguide, and wherein the disparity sensing port is located between two (2) millimeters (mm) and ten (10) millimeters (mm) above the waveguide.

* * * * *